United States Patent [19]

Mendez et al.

[11] Patent Number: 5,961,590
[45] Date of Patent: Oct. 5, 1999

[54] SYSTEM AND METHOD FOR SYNCHRONIZING ELECTRONIC MAIL BETWEEN A CLIENT SITE AND A CENTRAL SITE

[75] Inventors: Daniel J. Mendez, Mountain View; Mark D. Riggins, San Jose; Prasad Wagle, Santa Clara; Christine C. Ying, Foster City, all of Calif.

[73] Assignee: Roampage, Inc., Mountain View, Calif.

[21] Appl. No.: 08/897,888

[22] Filed: Jul. 22, 1997

Related U.S. Application Data

[63] Continuation-in-part of application No. 08/865,075, May 29, 1997, which is a continuation-in-part of application No. 08/835,997, Apr. 11, 1997.

[51] Int. Cl.$^6$ .................................................. G06F 13/00
[52] U.S. Cl. .............................................................. 709/206
[58] Field of Search ......................... 364/DIG. 1, DIG. 2; 358/402; 379/93.24, 100.08; 395/182.18, 200.3, 200.57, 825, 670, 676, 680; 709/206

[56] References Cited

U.S. PATENT DOCUMENTS

| | | | |
|---|---|---|---|
| 4,831,582 | 5/1989 | Miller et al. | 707/104 |
| 4,875,159 | 10/1989 | Cary et al. | 364/200 |
| 4,897,781 | 1/1990 | Chang | 364/200 |

(List continued on next page.)

OTHER PUBLICATIONS

Margaret J. Brown, "The Visto Briefcase Pro Puts Your PIM On The Internet", URL:http://www.zdnet.com/zdnn/stories/zdnn_display/0,3440,341892,00.html, Aug. 31, 1998, 1 page.

Web site entitled "Bookmark Translator 2.0: This Utility transform Microsoft Internet Explore's bookmarks in the format valid for Netscape Navigator and viceversa," Enzo Marinacci, Rome–Jul. 1997, URL=http://www.bns.it/em-ware/Bookmark Translator–uk.htm, pp. 1–4.

Article by Bellovin et al., entitled: "Network Firewalls" Published by IEEE Communications Magazine Sep. 1994, pp. 50–57.

Article by Steffen Stempel, entitled: "IPAccess–An Internet Service Access System for Firewall Installations" Published by IEEE Communications Magazine Feb. 16, 1995, pp. 31–41.

Article by Braun et al., entitled: "Web Traffic Characterization: an assessment of the impact of caching documents from NCSA's web server" Published by Elsevier Science B.V. 1995 pp. 37–51.

(List continued on next page.)

*Primary Examiner*—Robert B. Harrell
*Attorney, Agent, or Firm*—Graham & James LLP

[57] ABSTRACT

A system includes an e-mail engine which uses a proper protocol to retrieve an e-mail from a first mail store and to store the e-mail in one or more folder structures. Upon request, the first mail store may send configuration data indicating the proper protocol to the e-mail engine, which can then properly configure itself. An e-mail synchronization module uses a predetermined criterion to determine whether the e-mail was previously sent and whether to synchronize the e-mail with a second mail store. The e-mail synchronization module may also synchronize the e-mail of specific folder structures. The second mail store may be located on a global server, which upon proper identification and authentication provides roaming users with access to its contents. A communications module establishes a communications channel through any firewalls with the second mail store. A web engine sends the e-mail via the communications channel to the second mail store.

34 Claims, 15 Drawing Sheets

U.S. PATENT DOCUMENTS

| | | | |
|---|---|---|---|
| 5,263,157 | 11/1993 | Janis | 707/9 |
| 5,386,564 | 1/1995 | Shearer et al. | 395/650 |
| 5,392,390 | 2/1995 | Crozier | 395/161 |
| 5,572,643 | 11/1996 | Judson | 395/793 |
| 5,581,749 | 12/1996 | Hossain et al. | 707/1 |
| 5,600,834 | 2/1997 | Howard | 395/617 |
| 5,613,012 | 3/1997 | Hoffman et al. | 382/115 |
| 5,623,601 | 4/1997 | Vu | 395/187.01 |
| 5,627,658 | 5/1997 | Connors et al. | 358/407 |
| 5,634,053 | 5/1997 | Noble et al. | 395/604 |
| 5,647,002 | 7/1997 | Brunson | 395/182.8 |
| 5,652,884 | 7/1997 | Palevich | 395/651 |
| 5,666,553 | 9/1997 | Crozier | 395/803 |
| 5,678,039 | 10/1997 | Hinks et al. | 395/604 |
| 5,680,542 | 10/1997 | Mulchandani | 395/183.04 |
| 5,682,524 | 10/1997 | Freund et al. | 395/605 |
| 5,684,990 | 11/1997 | Boothby | 700/203 |
| 5,701,423 | 12/1997 | Crozier | 395/335 |
| 5,706,502 | 1/1998 | Foley et al. | 707/10 |
| 5,710,918 | 1/1998 | Lagarde et al. | 395/610 |
| 5,713,019 | 1/1998 | Keaten | 395/610 |
| 5,715,403 | 2/1998 | Stefik | 705/44 |
| 5,717,925 | 2/1998 | Harper et al. | 395/613 |
| 5,721,908 | 2/1998 | Lagarde et al. | 395/610 |
| 5,721,914 | 2/1998 | DeVries | 395/615 |
| 5,729,735 | 3/1998 | Meyering | 395/610 |
| 5,745,360 | 4/1998 | Leone et al. | 364/140 |
| 5,757,916 | 5/1998 | MacDoran et al. | 380/25 |
| 5,758,150 | 5/1998 | Bell et al. | 395/610 |
| 5,758,354 | 5/1998 | Huang et al. | 707/201 |
| 5,758,355 | 5/1998 | Buchanan | 707/201 |
| 5,765,171 | 6/1998 | Gehani et al. | 707/203 |
| 5,778,346 | 7/1998 | Frid-Nielsen et al. | 395/208 |
| 5,790,425 | 8/1998 | Wagle | 364/551.01 |
| 5,790,790 | 8/1998 | Smith et al. | 395/200.36 |
| 5,799,318 | 8/1998 | Cardinal et al. | 707/104 |
| 5,832,483 | 11/1998 | Barker | 707/8 |
| 5,870,759 | 2/1999 | Bauer et al. | 707/201 |

OTHER PUBLICATIONS

Article by Nelson et al., entitled: "Security for Infinite Networks" Published by IEEE Communications Magazine on Aug. 22, 1995, pp. 11–19.

Article by Greenwald et al., entitled: "Designing an Academic Firewall: Policy, Practice, and Experience with SURF" Published by IEEE Communications Magazine on Feb. 22, 1996, pp. 79–92.

Article by Kiuchi et al., entitled: "C–HTTP—The Development of a Secure, Closed HTTP–based Network on the Internet" Published by IEEE Proceedings of SNDSS on Feb. 22, 1996, pp. 64–75.

Article by S. Cobb, entitled: "Establishing Firewall Policy" Published by National Computer Security Assn. on Jun. 25–27, 1996, pp. 198–205.

(Global Format Bookmark Example)

SYSTEM AND METHOD FOR SYNCHRONIZING ELECTRONIC MAIL BETWEEN A CLIENT SITE AND A CENTRAL SITE

CROSS-REFERENCE TO RELATED APPLICATIONS

This application is a continuation-in-part application of patent application, Ser. No. 08/865,075, entitled "System and Method for Using a Global Translator to Synchronize Workspace Elements across a Network," filed on May 29, 1997, by inventors Daniel J. Mendez, Mark D. Riggins, Prasad Wagle and Christine C. Ying, which is herein incorporated by reference, which is a continuation-in-part of patent application Ser. No. 08/835,997, entitled "System and Method for Securely Synchronizing Multiple Copies of a Workspace Element in a Network," filed on Apr. 11, 1997, by inventors Daniel J. Mendez, Mark D. Riggins, Prasad Wagle and Christine C. Ying. These applications have also been assigned to RoamPage, Inc.

BACKGROUND OF THE INVENTION

1. Field of the Invention

This invention relates generally to computer networks, and more particularly the present invention provides a system and method for synchronizing electronic mail across a computer network.

2. Description of the Background Art

Data consistency is a significant concern for computer users. For example, when maintaining multiple independently modifiable copies of a document, a user risks using an outdated version. By the time the user notices an inconsistency, interparty miscommunication or data loss may have already resulted. The user must then spend more time attempting to reconcile the inconsistent versions and addressing any miscommunications.

The problems of data inconsistency is exacerbated when copies of a document are inaccessible. For example, when multiple copies of a document are maintained at different network locations, network security systems such as conventional firewall technology compromise data accessibility. That is, a user may have access to only a particular one of these network locations. Without access to the other sites, the user cannot confirm that the version on an accessible site is the most recent draft.

The problems of data consistency and accessibility arise in the area of electronic mail (e-mail). For example, a user might maintain an e-mail database at work. Based on the security systems implemented by the work intranet, the user may not be afforded access to the database and thus cannot read or respond to the e-mails until returning to work. Further, a traveling user currently working at a remote terminal may not have the necessary dedicated application programs to pass the intranet security. Still further, when maintaining several sites, the traveling user is burdened to maintain a record of all procedures and passwords to overcome the security system at each site.

These problems are further exacerbated when using e-mail programs from different vendors and which implement different protocols. For example, the Netscape Navigator™ e-mail client and the Outlook Express™ e-mail client each manage e-mail across computer networks. However, each e-mail client uses different formats, stores e-mails in different files and implements different protocols. Thus, the e-mails are not readily interchangeable.

Therefore, a system and method are needed for providing users with e-mail consistency and accessibility across a computer network.

SUMMARY OF THE INVENTION

The present invention provides a system including an e-mail engine for using the proper protocol to retrieve an e-mail from a first mail store. That is, the e-mail engine and the first mail store implement the same protocol, e.g., the Post Office Protocol (POP3), to communicate therebetween. Upon request, the first mail store may send configuration data indicating the proper protocol to the e-mail engine, which can then properly configure itself.

The system further includes an e-mail synchronization module which uses a predetermined criterion to determine whether to send the e-mail to a second mail store. For example, the e-mail synchronization module need not send an e-mail to the second mail store if the e-mail was previously sent. The second mail store may be located on a global server, which upon proper identification and authentication provides roaming (traveling) users with HTML access to its contents.

The system further includes a communications module for establishing a communications channel with the second mail store. If the second store is protected by a firewall, the communications module is authorized to establish a secure communications link through the firewall with the second store. The system still further includes a web engine for using the HyperText Transfer Protocol (HTTP) to send the e-mail via the communications channel to the second mail store. The system may be stored on a computer-readable storage medium.

Another system which embodies the present invention can be broadly described to include means for retrieving an e-mail from a first mail store, means coupled to the retrieving means for using a predetermined criterion to determine whether to send the e-mail to a second mail store, means coupled to the using means for establishing a communications channel with the second mail store, and means coupled to the establishing means for sending the e-mail to the second mail store.

Similarly, a method which embodies the present invention includes the steps of retrieving an e-mail from a first mail store, using a predetermined criterion to determine whether to send the e-mail to a second mail store, establishing a communications channel with the second mail store, and sending the e-mail to the second mail store.

The system and method advantageously use a trusted third party to enable synchronization of electronic mail across a network. Accordingly, a user who maintains for example a work site, a home site and the global server site can synchronize e-mails among all three sites. The roaming user thus can access and reply to e-mails while away from the addressed site. Because the system and method operate over the Internet, synchronization can occur over any distance. Since the system and method include format translation, merging of e-mails between different application programs and different platforms is possible. Further, because synchronization is initiated from within the firewall and uses commonly enabled protocols such as HyperText Transfer Protocol (HTTP), the typical firewall which prevents in-bound communications in general and some outbound protocols does not act as an impediment to e-mail synchronization. Also. since the user's preferences may be previously set, the present system and method may operate unattended by the client user.

DETAILED DESCRIPTION OF THE PREFERRED EMBODIMENT

Figure 1:
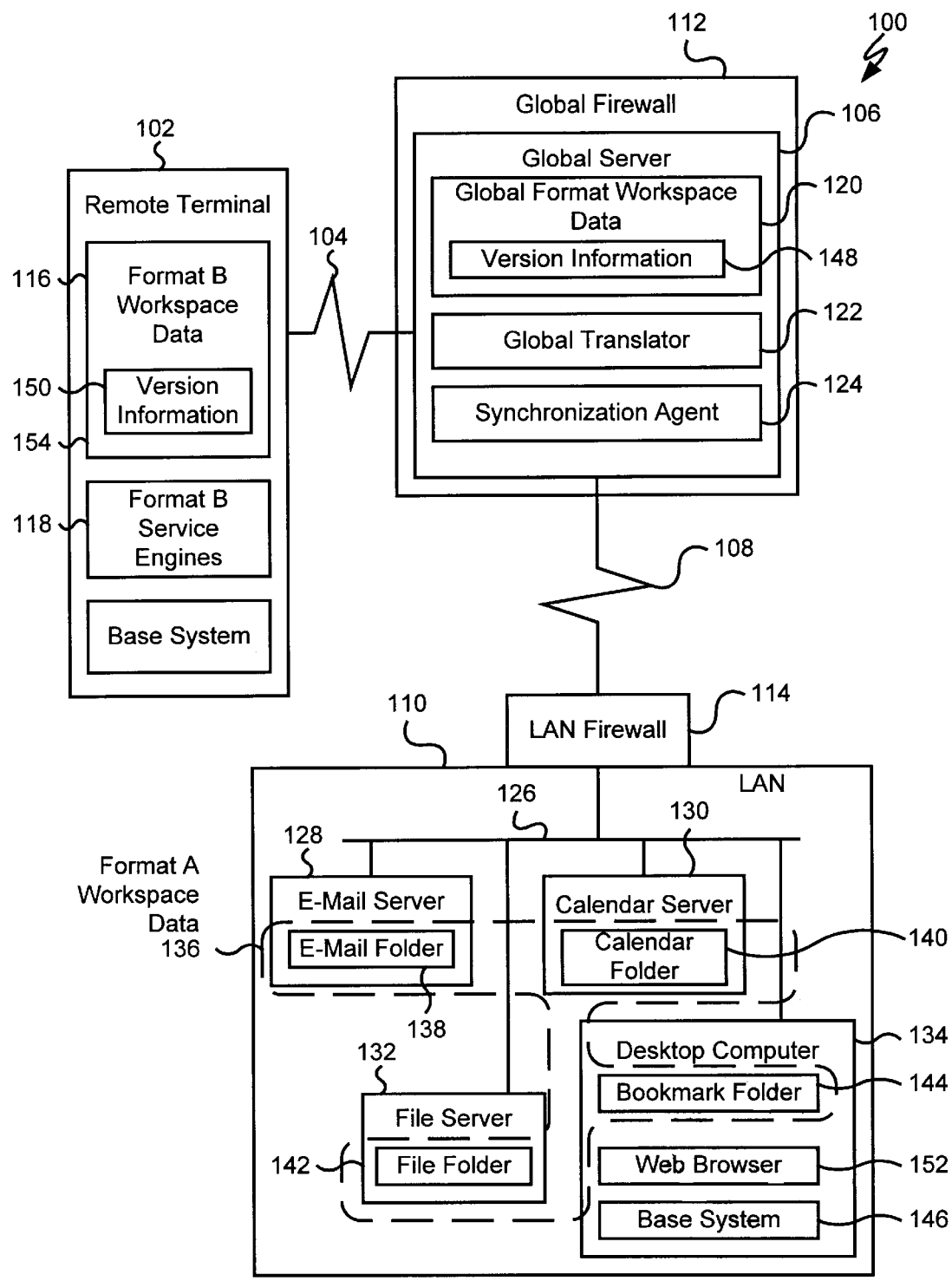
FIG. 1 is a block diagram illustrating a computer network in accordance with the present invention.

FIG. 1 is a block diagram illustrating a computer network 100, comprising a first node such as a remote computer terminal 102 coupled via a communications channel 104 such as the Internet to a global server 106. The global server 106 is in turn coupled via a communications channel 108 such as the Internet to a second node such as a Local Area Network (LAN) 110. The global server 106 is protected by a global firewall 112, and the LAN 110 is protected by a LAN firewall 114.

The LAN 110 includes a system bus 126 coupling the LAN firewall 114 to an e-mail server 128 having an e-mail folder 138 containing e-mails, to a file server 132 having a file folder 142 containing files, to a calendar server 130 having a calendar folder 140 containing calendar data, and to a desktop computer 134 having a web browser 152 and a bookmark folder 144 containing bookmarks. It will be appreciated that the e-mail folder 138, file folder 142, calendar folder 140 and bookmark folder 144 or portions thereof may be stored at different locations such as on the desktop computer 134. The e-mail folder 138, file folder 142, calendar folder 140 and bookmark folder 144 are exemplary, grouped by like information and are collectively referred to herein as "workspace data" 136. Those skilled in the art will recognize that the workspace data 136 may include other types of data such as an application program such as Microsoft Word 6.0.1 and the documents created using them. It will be further appreciated that the e-mail folder 138, file folder 142, calendar folder 140 and bookmark folder 144 may each be divided into workspace elements, wherein each workspace element folder or each workspace element individually is identified by particular version information 255 (described below with reference to FIG. 2). Accordingly, each e-mail or e-mail folder, file or file folder, calendar or calendar folder, bookmark or bookmark folder, document or document folder, etc. may be referred to as "a workspace element."

Each workspace element of workspace data 136 in LAN 110 is maintained in a predetermined format, referred to as Format A, which is based on the service engine 245 (FIG. 2) that created it. For example, the web browser 152 on the desktop computer 134 may be the Netscape Navigator™ web browser, and the bookmarks in the bookmark folder 144 created thereby are maintained in Format A. Although Format A is being described as a single format, one skilled in the art knows that Format A actually includes a format for each information type, e.g., there will be a Format A for bookmarks, a Format A for files, a Format A for calendar data, a Format A for e-mails, etc.

The remote terminal 102 stores service engines 154 for maintaining workspace data 116, which may include information common with information in the workspace data 136. The workspace data 116 is maintained in a format, referred to as Format B, which may be different from Format A. Format B is also based on the service engines 154 that create the workspace elements. For example, if one of the service engines 154 is the Internet Explorer™ web browser (not shown), then the bookmarks (not shown) created therewith are maintained in Format B. Although Format B is being described as a single format, one skilled in the art knows that Format B actually includes a format for each information type. Further, the workspace data 116 also includes version information 150 similar to version information 255 described below with reference to FIG. 2.

It will be appreciated that remote terminal 102 may include a smart telephone, a Personal Data Assistant (PDA) such as the PalmPilot system by the U.S. Robotics, Inc., a laptop computer, etc. As a smart telephone, the workspace data 116 may include telephone numbers and e-mails. As a PDA, the workspace data 116 may include addresses, calendar data and e-mails. As a laptop computer, the workspace data 116 may include the same types of information as workspace data 136.

The global server 106 acts as a third party administrator. The global server 106 stores independently modifiable copies of selected portions of the workspace data 136 and 116, collectively referred to herein as workspace data 120. Accordingly, the workspace data 120 includes an independently modifiable copy of each workspace element in the selected portions of the workspace data 136 and 116 and an independently modifiable copy of each corresponding version information 255 (FIG. 2) and 150. The version information copies are collectively referred to herein as version information 148, and are also described with reference to FIG. 2.

The global server 106 maintains the workspace data 120 in a format, referred to as a "global format," which is selected to be easily translatable by the global translator 122 to and from Format A and to and from Format B. Although the global format is being described as a single format, one skilled in the art knows that the global format actually includes a global format for each information type, e.g., there will be a global format for bookmarks, a global format for files, a global format for calendar data, a global format for e-mails, etc. An example bookmark workspace element in the global format is described in detail below with reference to FIG. 6.

Network 100 further comprises synchronization means, which includes a base system 146 stored within the LAN 110 and for example on the desktop computer 134. Network 100 further includes a synchronization agent 124 stored outside the LAN firewall 114 and preferably on the global server 106. The base system 146 and the synchronization agent 124 cooperate to synchronize selected portions of the workspace data 136 with selected portions of the workspace data 120. The synchronization means may synchronize workspace elements individually, e.g., specific word processor documents, or may synchronize workspace element folders, e.g., a bookmark folder. Generally, the base system 146 manages the selected portion of the workspace data 136 within the LAN 110 and the synchronization agent 124 manages the selected portions of the workspace data 120 within the global server 106. It will be appreciated that the global translator 122 cooperates with the synchronization means to translate data formats to and from the global format. As described in greater detail below with reference to FIG. 4, the base system 190 preferably initiates and controls data synchronization. Other components and functions of the global server 106 are described in the cross-referenced patent application which is herein incorporated by reference.

The synchronization means may also include, stored on the remote terminal 102, a base system 118 which operates in a similar manner to the base system 146. The base system 118 on the remote terminal 102 cooperates with the synchronization agent 124 to synchronize selected portions of the workspace data 116 with selected portions of the workspace data 120. As described in greater detail below with reference to FIG. 4, the base system 118 on the remote terminal 102 also preferably initiates and controls data synchronization with the global server 106. Also, note that the distribution of labor between the base system 118 in the remote terminal 102 and the synchronization agent 124 in the global server 106 may vary. Sometimes, primarily when the remote terminal 102 is a relatively less computationally powerful device (such as a smart phone or a PDA), most of the actual computationally intensive work will occur within the synchronization agent 124 in the global server 106. In other situations, for example, when the remote terminal 102 is a fully configured PC, most of the computationally-intensive work will occur locally on the base system 118 in the remote terminal 102.

Accordingly, the synchronization means independently synchronizes the selected portions of workspace data 116 and 136 with the selected portions of the workspace data 120. Thus, the synchronization means indirectly synchronizes workspace data 136 with workspace data 116.

Figure 2:
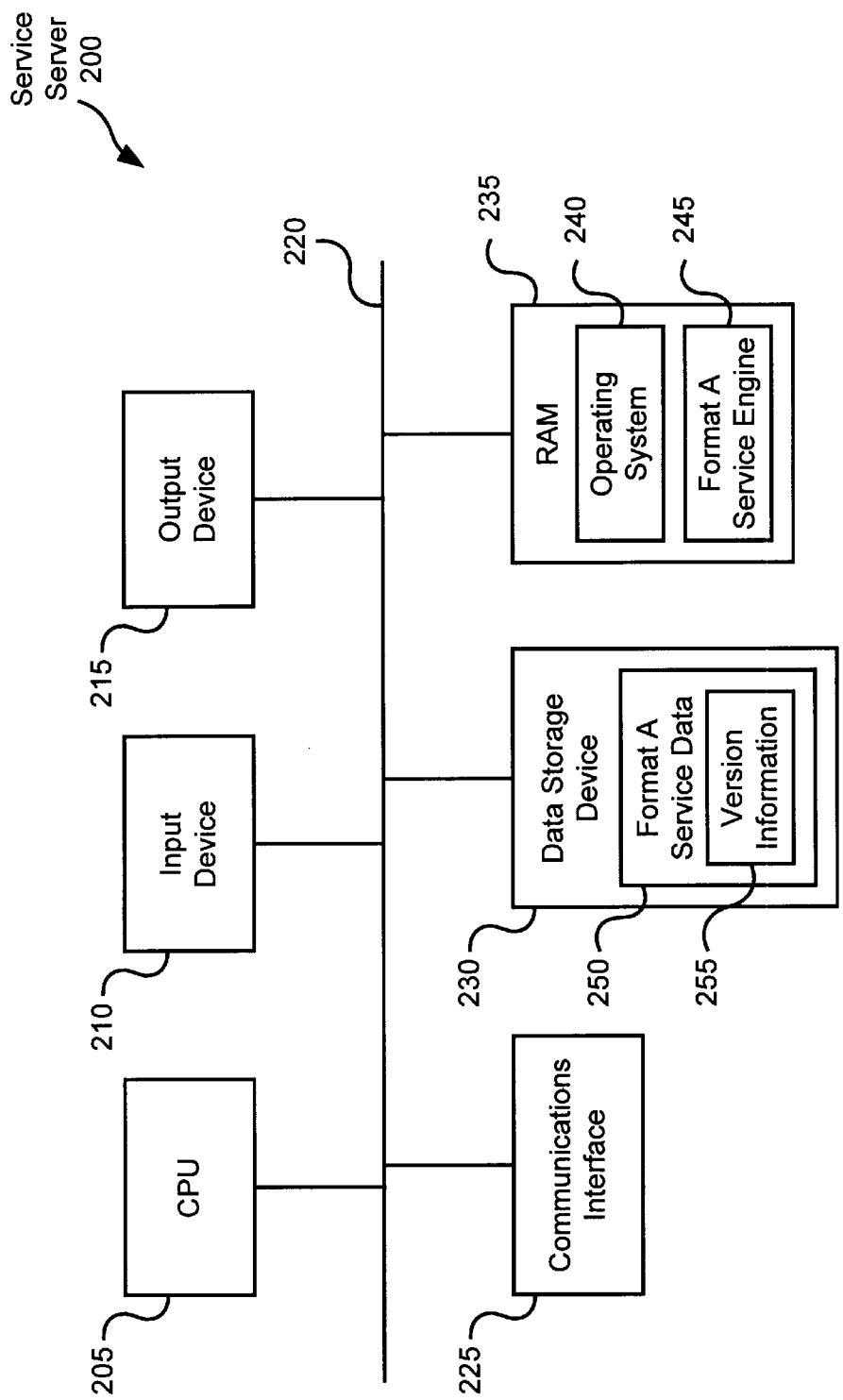
FIG. 2 is a block diagram illustrating details of a FIG. 1 service server.

FIG. 2 is a block diagram illustrating details of a service server 200, wherein each of the e-mail server 145, the file server 150, the calendar server 155 and the desktop computer 160 is an instance thereof. Service server 200 includes a Central Processing Unit (CPU) 205 such as an Intel Pentium® microprocessor or a Motorola Power PC® microprocessor. An input device 210 such as a keyboard and mouse and an output device 215 such as a Cathode Ray Tube (CRT) display are coupled via a signal bus 220 to CPU 205. A communications interface 225 (such as an Ethernet port), a data storage device 230 (such as a magnetic disk), and Random-Access Memory (RAM) 235 are further coupled via signal bus 220 to the CPU 205.

An operating system 240 includes a program for controlling processing by the CPU 205, and is typically stored in the data storage device 230 and loaded into the RAM 235 for execution. A service engine 245 includes a program for performing a particular service such as maintaining an e-mail database, a file database, a calendar database or a bookmarks database. The service engine 245 may also be stored in the data storage device 230 and loaded into the RAM 235 for execution.

To perform a service, the service engine 245 creates service data 250 (e.g., an e-mail or an e-mail folder 138 containing e-mails, a file or a file folder 142 containing files, calendar data or a calendar folder 140 containing calendar data, a bookmark or a bookmark folder 144 containing bookmarks, etc.) in Format A according to predetermined protocols. The service engine 245 stores the data 250 in the data storage device 250. The service data 250 includes version information 255 indicating the date and time of the last modification and the status as of the last interaction with the global server 106.

For example, if service data 250 is created and selected to be merged with global server workspace data 120, then the version information 255 for the service data 250 may include the date of last modification and a null set indicating the status as of the last interaction with the global server 106. From the version information 255, the base system 146 determines that the service data 250 in its entirety has not been merged with the global server workspace data 120. Similarly, if the service data 255 included elements 1, 2 and 3 as of the last modification, then the previous status as of the last interaction will indicate that the service data 255 included elements 1, 2 and 3. If the service data 255 currently includes elements 2, 3 and 4, then the base system 140 will determine that, since last synchronization, element 1 has been deleted and element 4 has been added.

It will be appreciated that the version information 148 on the global server 106 includes information similar to version information 255. That is, the version information 148 will include information indicating the date and time the version was last modified and the status as of the last interaction with each client. The service engine 245 operates to update the version information 255 after modifications are made and after synchronization occurs.

Figure 3:
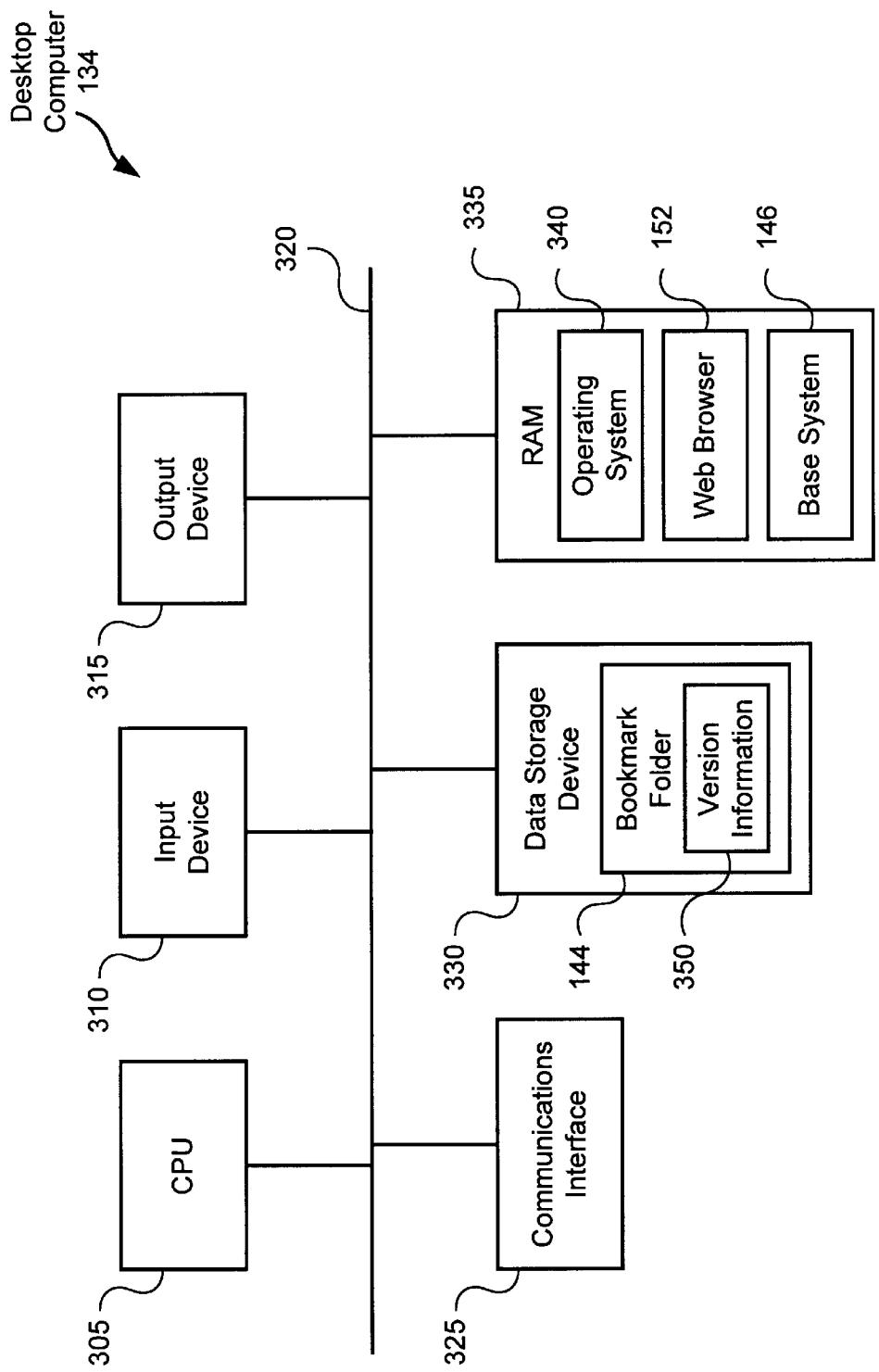
FIG. 3 is a block diagram illustrating details of the FIG. 1 desktop computer.

FIG. 3 is a block diagram illustrating details of the desktop computer 160, which includes a CPU 305, an input device 310, an output device 315, a communications interface 325, a data storage device 330 and RAM 335, each coupled to a signal bus 320.

An operating system 340 includes a program for controlling processing by the CPU 305, and is typically stored in the data storage device 330 and loaded into the RAM 335 for execution. A web browser 152 (i.e., a particular service engine 245, FIG. 2) includes a Format A service program for managing bookmark folder 144 (i.e., particular service data 250, FIG. 2) which includes version information 350 (i.e., particular version information 255, FIG. 2). The web browser 152 may be also stored in the data storage device 330 and loaded into the RAM 335 for execution. The bookmark folder 144 may be stored in the data storage device 330. As stated above with reference to FIG. 1, the base system 146 operates to synchronize the workspace data 136 (which includes the bookmark folder 144) with the workspace data 120. The base system 146 may be also stored in the data storage device 330 and loaded into the RAM 335 for execution.

Figure 4:
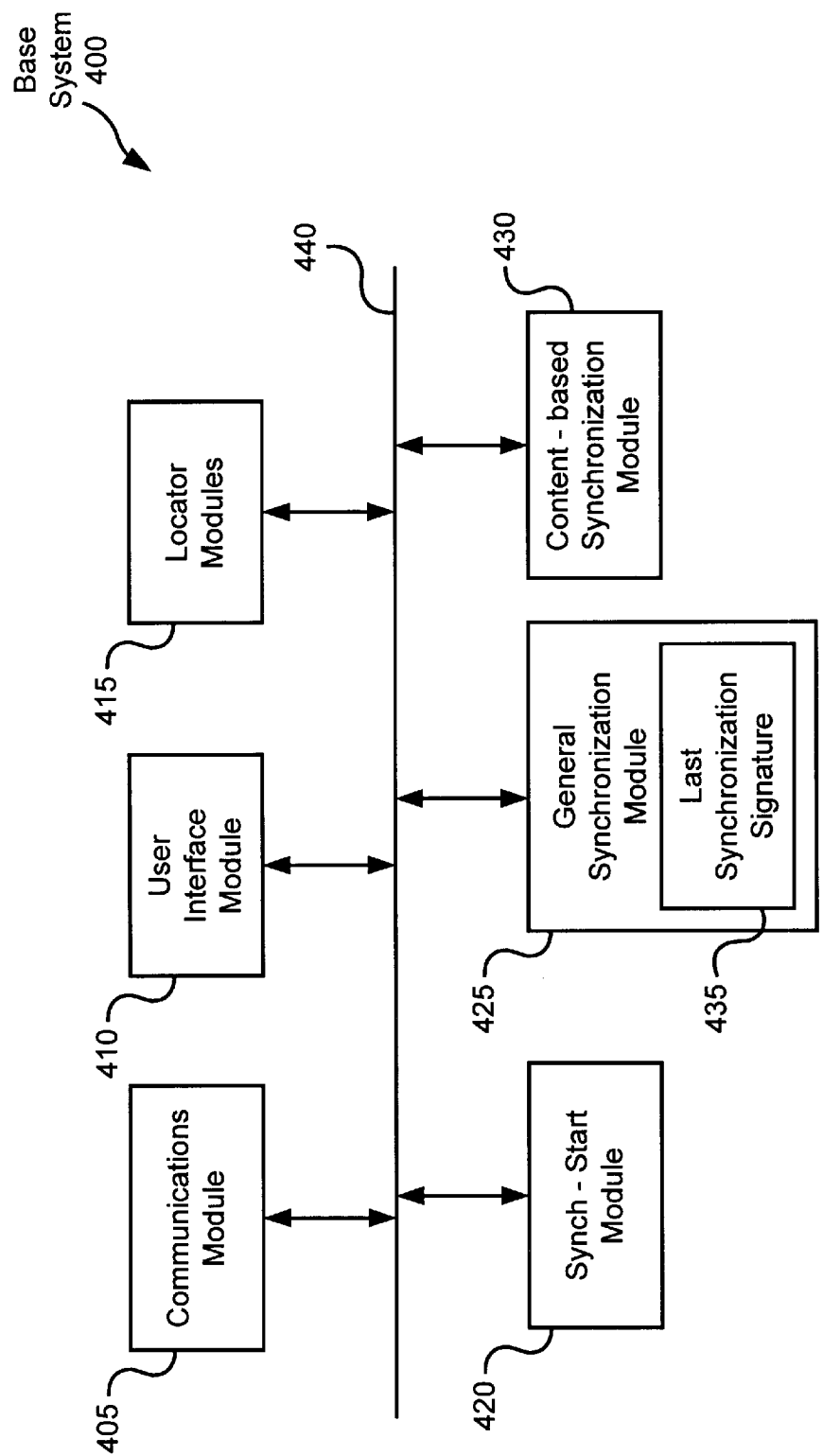
FIG. 4 is a block diagram illustrating details of a FIG. 1 base system.

FIG. 4 is a block diagram illustrating details of the base system 400, which exemplifies base systems 146 and 118. Base system 400 includes a communications module 405, a user interface module 410, locator modules 415, a synchronization-start ("synch-start") module 420, a general synchronization module 425 and a content-based synchronization module 430. For simplicity, each module is illustrated as communicating with one another via a signal bus 440.

The communications module 405 includes routines for compressing data and routines for communicating via the communications interface 325 (FIG. 3) with the synchronization agent 124 (FIG. 1). The communications module 405 may further include routines for applying Secure Socket Layer (SSL) technology and user identification and authentication techniques (i.e., digital certificates) to establish a secure communication channel through the global firewall 112. Examples of communications modules 405 may include TCP/IP stacks or the AppleTalk® protocol.

The user interface module 410 includes routines for communicating with a user, and may include a conventional Graphical User Interface (GUI). The user interface module 410 cooperates with the other system components as described herein.

The locator modules 415 include routines for identifying the memory locations of the workspace elements in the workspace data 136 or 116 and in the workspace data 120. Workspace element memory location identification may be implemented using intelligent software, i.e., preset memory addresses or the system's registry, or using dialogue boxes to query a user. More particularly, the locator modules 415 in the base system 146 determine the memory addresses of the e-mail folder 138, the file folder 142, the calendar folder 140 and the bookmark folder 144 and the memory addresses of the workspace elements therein. The locator modules 415 also determine the corresponding memory addresses of the corresponding folders in the workspace data 120 and the corresponding workspace elements therein. Similarly, the locator modules 415 in the base system 118 determine the memory locations of the workspace elements of workspace data 116 and the memory locations of the corresponding workspace elements in the workspace data 120.

It will be appreciated that the locator modules 415 may include locator modules 415 specifically dedicated to each folder or workspace data type. That is, the locator modules 415 may include a locator module 415 dedicated to locating bookmarks, a locator module 415 dedicated to locating e-mails, a locator module 415 dedicated to locating files, a locator module 415 dedicated to locating calendar appointments, etc. It will be further appreciated that the locator modules 415 may perform workspace element memory location identification upon system boot-up or after each communication with the global server 120 to maintain updated memory addresses of workspace elements.

The synchronization-start module 420 includes routines for determining when to initiate synchronization of workspace data 136 or 116 with workspace data 120. For example, the synchronization-start module 420 may initiate data synchronization upon user request, at a particular time of day, after a predetermined time period passes, after a predetermined number of changes, after a user action such as user log-off or upon like criteria. The synchronization-start module 420 initiates data synchronization by instructing the general synchronization module 425 (described below) to begin execution of its routines. It will be appreciated that communication with the synchronization agent 124 preferably initiates from within the LAN 110, because the typical firewall 114 prevents in-bound communications and allows out-bound communications.

The general synchronization module 425 includes routines for receiving version information 148 for modified versions from the synchronization agent 124 (FIG. 1), and routines for examining the version information 255 or 150 against a last synchronization signature 435 (such as a last synchronization date and time) to determine which versions have been modified. The general synchronization module 425 further includes routines for examining the version information 148 and the version information 255 or 150 to determine if one or both versions of a particular workspace element or workspace element folder have been modified.

Further, the general synchronization module 425 includes routines for performing an appropriate synchronizing responsive action. Appropriate synchronizing responsive actions may include, if only one version of a workspace element in workspace data 136 or 116 has been modified, then forwarding the modified version (as the preferred version) to the other store(s) or determining and forwarding only the changes made. Computing the changes made may be performed by examining the current status against the previous status as of the last synchronization or by comparing the two versions. It will be appreciated that no content-based review of the changes is needed. It will be appreciated that one store preferably forwards only the changes to the other store for optimizing use of processor power and minimizing the data communications across the communications channel 108 or 104.

Other appropriate synchronizing responsive actions may include, if two versions of a workspace element have been modified independently, then instructing the content-based synchronization module 430 (described below) to execute its routines. That is, if two versions of the same workspace element have been modified independently, then a content-based review of the changes is preferable. Upon completion of the data synchronization, the general synchronization module 425 updates the last synchronization signature 435.

The content-based synchronization module 430 includes routines for reconciling two or more modified versions of a workspace element. For example, if a user has independently modified the original and the copy of a workspace element since the last synchronization, then the content-based synchronization module 430 determines an appropriate responsive action. The content-based synchronization module 430 may request the user to select a preferred one of the modified versions or may respond based on preset preferences, i.e., by storing both versions in both stores or preferably by integrating the modified versions into a single preferred version which replaces each modified version at both stores.

The content-based synchronization module 430 examines the changes made to each version and determines if conflicts exist. When implementing version integration, a conflict may arise if inconsistent modifications such as deleting a paragraph in one version and modifying the same paragraph in the other version have been made. If a conflict exists, then the content-based synchronization module 430 attempts to reconcile the conflict, e.g., by requesting user selection or by storing both versions at both stores. Otherwise, if no conflict exists, then the content-based synchronization module 430 integrates the changes to each of the versions and updates the version information 148, 150 or 255 accordingly.

Figure 5:
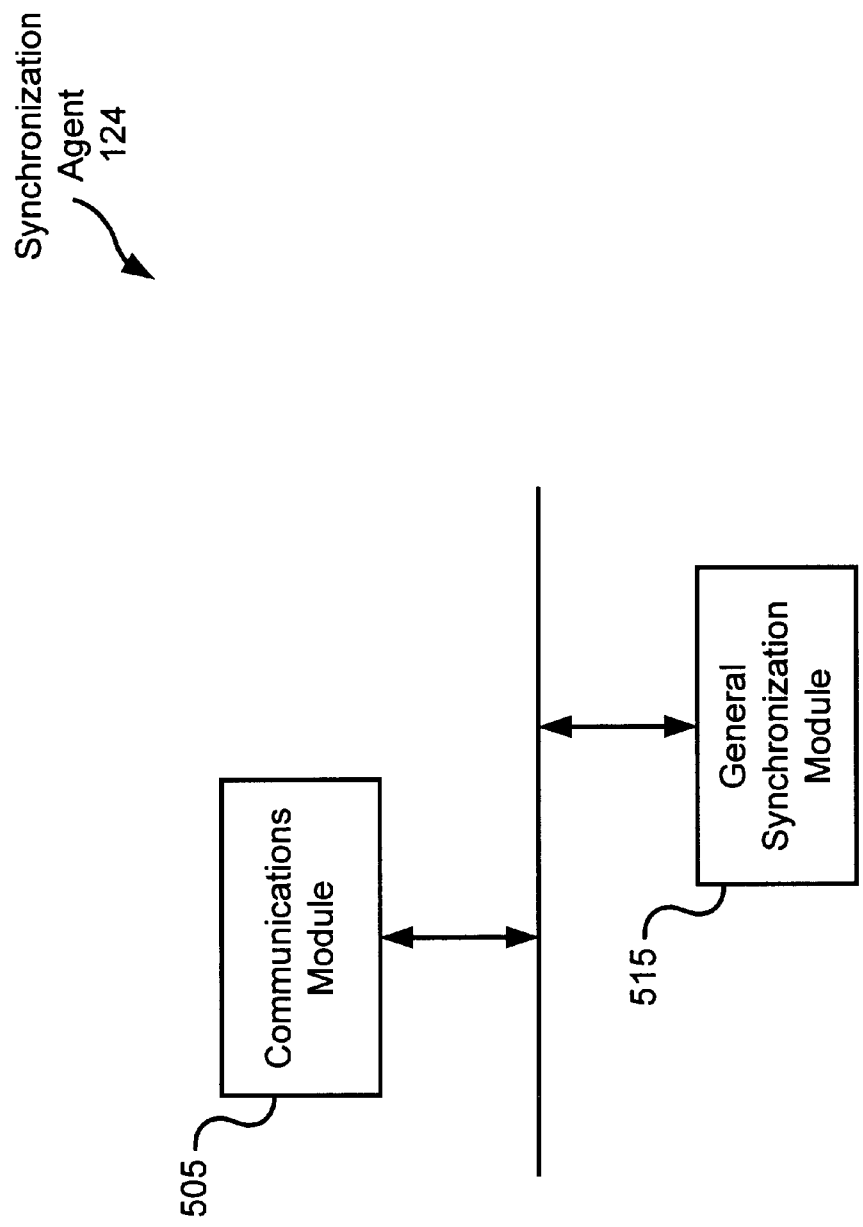
FIG. 5 is a block diagram illustrating details of the FIG. 1 synchronization agent.

FIG. 5 is a block diagram illustrating details of the synchronization agent 124, which includes a communications module 505 (similar to the communications module 405 described above with reference to FIG. 4) and a general synchronization module 515 (similar to the general synchronization module 425 described above also with reference to FIG. 4).

The communications module 505 includes routines for compressing data, and routines for communicating via the communications channel 108 with the base system 146 or via the communications channel 104 with the base system 118. The communications module 505 may further include routines for establishing a secure communications channel through the global firewall 112 and through the LAN firewall 114 with the communications module 405.

Similar to the general synchronization module 425, the general synchronization module 515 includes routines for examining the version information 148 and the last synchronization signature 435 (FIG. 4) to determine which versions have been modified and the changes made. It will be appreciated that the general synchronization module 515 may maintain its own last synchronization signature 435 copy (not shown) or may request the last synchronization signature 435 from the base system 146 or 118. The general synchronization module 515 further includes routines for forwarding workspace data 120 determined to be modified to the general synchronization module 425, and routines for receiving preferred versions of workspace elements of workspace data 136 or 116 or just the changes from the general synchronization module 425.

Figure 6:
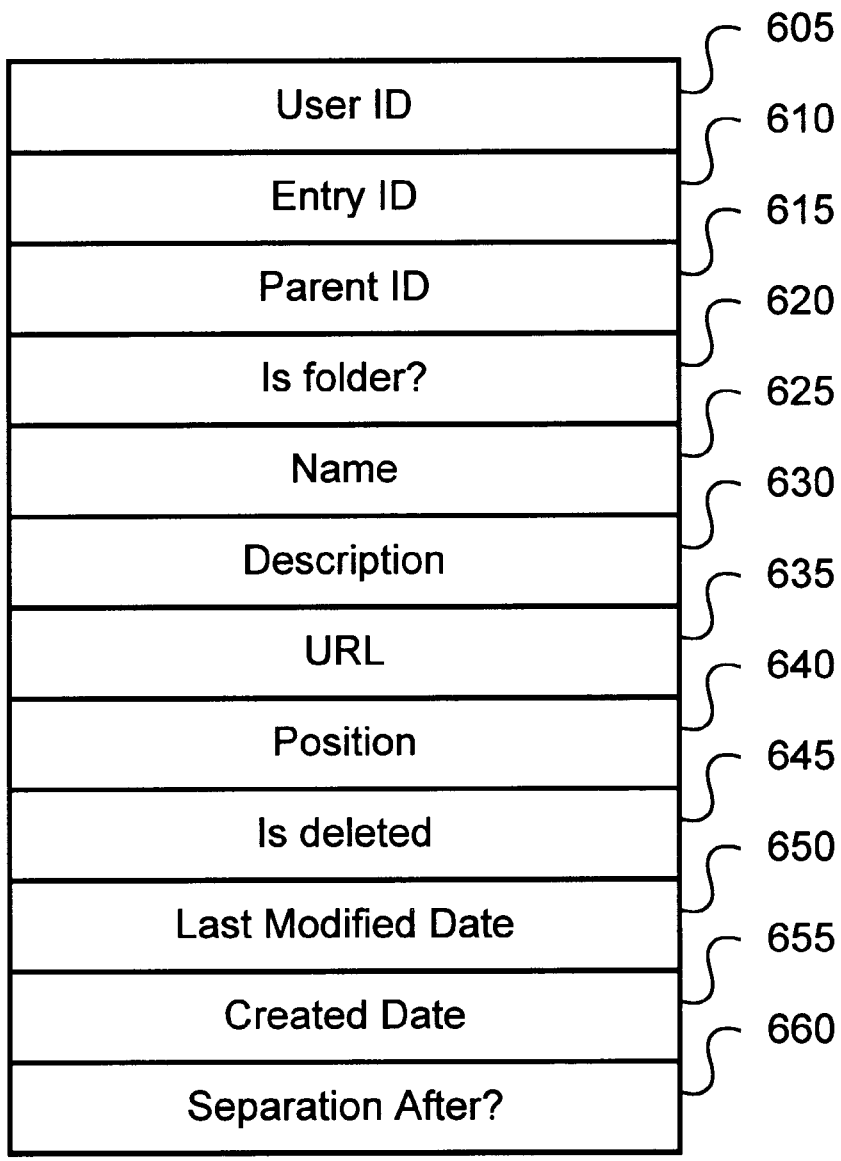
FIG. 6 is a graphical representation of an example bookmark in the global format.

FIG. 6 illustrates an example bookmark workspace element in the global format. The global translator 122 incorporates all the information needed by both formats (Format A and Format B) to create the Global Format. For example, if a bookmark in Format A needs elements X, Y and Z and a bookmark in Format B needs elements W, X and Y, the global translator 122 incorporates elements W, X, Y and Z to create a bookmark in the Global Format. Further, the global translator 122 incorporates the information which is needed by the synchronization means such as the last modified date. Accordingly, a bookmark in the Global Format includes a user identification (ID) 605, an entry ID 610, a parent ID 615, a folder ID flag 620, a name 625, a description 630, the Uniform Resource Locator (URL) 635, the position 640, a deleted ID flag 645, a last modified date 650, a created date 655 and a separation ID flag 660.

Figure 7:
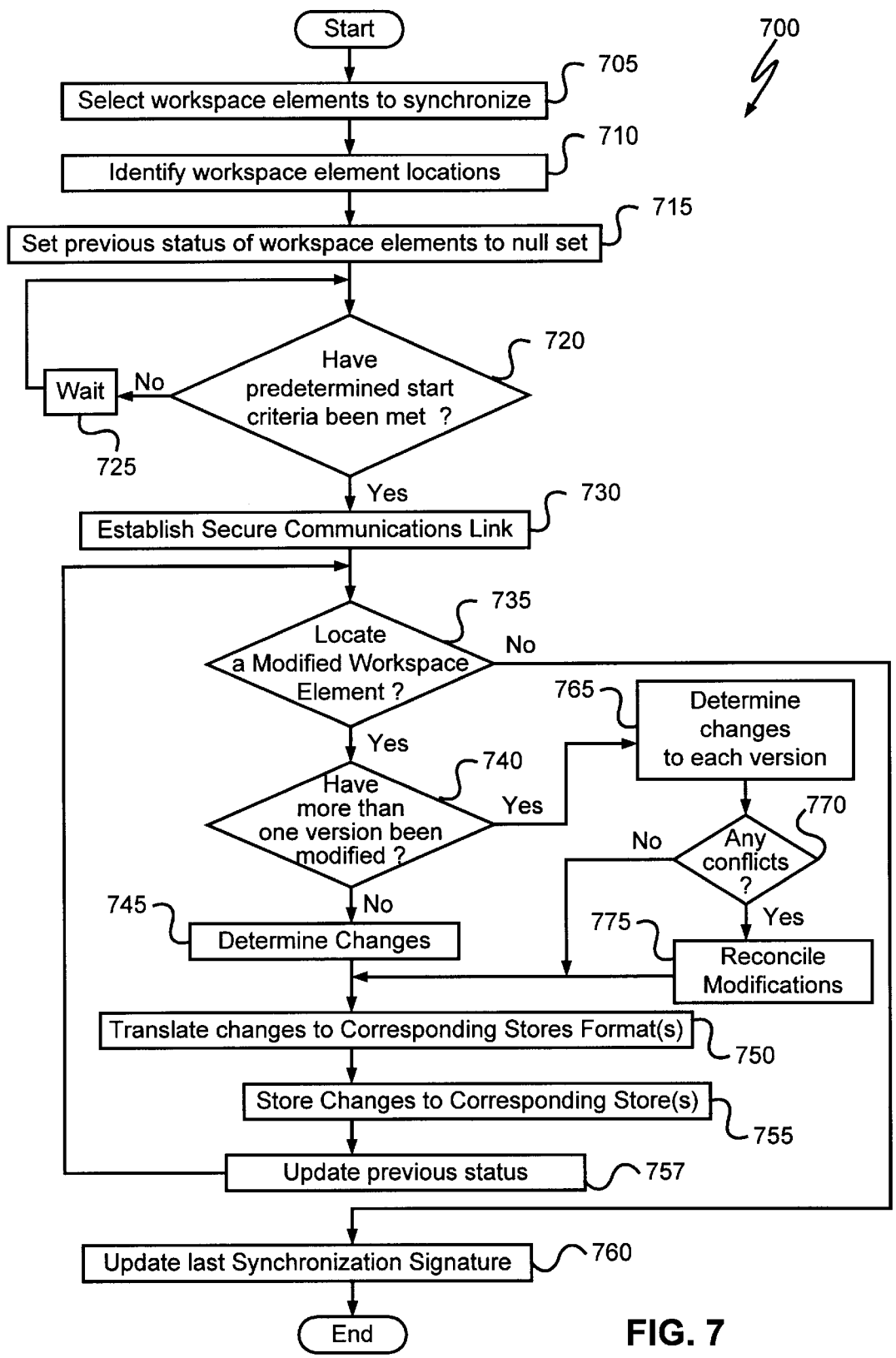
FIG. 7 is a flowchart illustrating a method for synchronizing multiple copies of a workspace element in a secure network.

FIG. 7 is a flowchart illustrating a method 700 for using a global translator 122 to synchronize multiple copies of a workspace element in a secure network 100. Method 700 begins with the user interface module 410 in step 705 enabling a user to select workspace elements of workspace data 136 and 118 for the synchronization means to synchronize. The locator modules 415 in step 710 identify the memory locations of the workspace elements in workspace data 136 and 116 and the corresponding memory locations in workspace data 120. If a selected workspace element does not have a corresponding memory location, such as in the case of adding a new workspace element to the global server 106, then one is selected. The selected memory location may be a preexisting workspace element or a new workspace element. As stated above, workspace element memory location identification may be implemented using intelligent software or dialogue boxes. The general synchronization module 425 and general synchronization module 515 in step 715 set the previous status of the workspace elements equal to the null set. Setting the previous status to the null set indicates that all information of the workspace element has been added.

The synchronization-start module 420 in step 720 determines whether predetermined criteria have been met which indicate that synchronization of the workspace elements selected in step 705 should start. If not, then the synchronization-start module 420 in step 725 waits and loops back to step 720. Otherwise, the communications module 405 and communications module 505 in step 730 establish a secure communications channel therebetween.

The general synchronization module 425 and the general synchronization module 515 in step 735 determine whether any workspace elements have been modified. That is, the general synchronization module 425 in step 740 examines the version information 255 or 150 of each selected workspace element in the workspace data 136 or 116 against the last synchronization signature 435 to locate modified workspace elements. This comparison may include comparing the date of last modification with the date of last synchronization, or may include a comparison between the current status and the previous status as of the last interaction. Similarly, the general synchronization module 515 examines the version information 148 of each corresponding workspace element in workspace data 120 and the last synchronization signature 435 to locate modified workspace elements.

If in step 735 no modified workspace elements or folders are located, then the general synchronization modules 425 and 515 in step 760 update the last synchronization signature 435 and method 700 ends. Otherwise, the general synchronization module 425 in step 740 determines whether more than one version of a workspace element has been modified since the last synchronization.

If only one version has been modified, then the corresponding general synchronization module 425 or 515 in step 745 determines the changes made. As stated above, determining the changes made may be implemented by comparing the current status of the workspace element against the previous status of the workspace element as of the last interaction therebetween. If the changes were made only to the version in the workspace data 120, then the global translator 122 in step 750 translates the changes to the format used by the other store, and the general synchronization module 515 in step 755 forwards the translated changes to the general synchronization module 425 for updating the outdated workspace element in the workspace data 136 or 116. If the updated version is a workspace element in the workspace data 136 or 116, then the general synchronization module 425 sends the changes to the updated version to the global translator 122 for translation and then to the general synchronization module 515 for updating the outdated workspace element in the workspace data 120. The general synchronization module 425 and the general synchronization module 515 in step 757 update the previous state of to reflect the current state as of this interaction. Method 700 then returns to step 735.

If the general synchronization module 425 in step 740 determines that multiple versions have been modified, then the general synchronization module 425 in step 765 computes the changes to each version and in step 770 instructs the content-based synchronization module 430 to examine content to determine if any conflicts exist. For example, the content-based synchronization module 430 may determine that a conflict exists if a user deletes a paragraph in one version and modifies the same paragraph in another version. The content-based synchronization module 430 may determine that a conflict does not exist if a user deletes different paragraphs in each version. If no conflict is found, then method 700 jumps to step 750 for translating and forwarding the changes in each version to the other store. However, if a conflict is found, then the content-based synchronization module 430 in step 775 reconciles the modified versions. As stated above, reconciliation may include requesting instructions from the user or based on preselected preferences performing responsive actions such as storing both versions at both stores. Method 700 then proceeds to step 750.

It will be appreciated that in step 710 new workspace elements and preexisting workspace elements to which new workspace elements will be merged are set to "modified" and the previous status is set to the null set. Thus, the general synchronization module 425 in step 740 will determine that more that one version has been modified and the content-based synchronization module 430 in step 770 will determine that no conflict exists. The changes in each will be translated and forwarded to the other store. Accordingly, the two versions will be effectively merged and stored at each store.

For example, if a first bookmark folder was created by the web browser 152 on the desktop computer 134, a second folder was created by a web browser (not shown) on the remote terminal 102, no preexisting folder existed on the global server 106 and the user selected each of these folders for synchronization, then the synchronization means will effectively merge the first and second folders. That is, the general synchronization module 425 on the desktop computer 134 will determine that the first folder has been modified and the previous status is equal to the null set. The general synchronization module 425 will determine and send the changes, i.e., all the workspace elements in the first folder, to a new global folder on the global server 106. Similarly, the general synchronization module 425 on the remote terminal 102 will determine that, as of its last interaction, the previous status of each of the second and the global folders is the null set. The general synchronization module 425 will instruct the content-based synchronization module 430 to examine the changes made to each folder to determine whether a conflict exists. Since no conflicts will exist, the general synchronization module 425 will forward the changes to the global folder and the general synchronization module 515 will forward its changes to the second store, thereby merging the workspace elements of the first and second folders in the global and second folders. The general synchronization module 515 will inform the general synchronization module 425 that the global folder has been modified relative to the last interaction, and will forward the new changes to the first folder. Thus, the first and second folders will be merged and stored at each store.

For a second example, the user may select an exemplary document in the LAN 110 to be synchronized. The general synchronization module 425 will forward the document to the global server 106. Similarly, the user may select the same document for synchronization on the remote terminal 102. The general synchronization module 515 will forward the document to the remote terminal 102. If changes were made to the documents independently, then the content-based synchronization module 430 will examine the content of the documents to determine if a conflict exists. If no conflict exists, then as described above, the general synchronization modules 425 and 515 will merge the documents. Otherwise, if a conflict does exist, the content-based synchronization module 430 will reconcile the changes and then the general synchronization modules 425 and 515 will forward the reconciled changes to each other.

Figure 8:
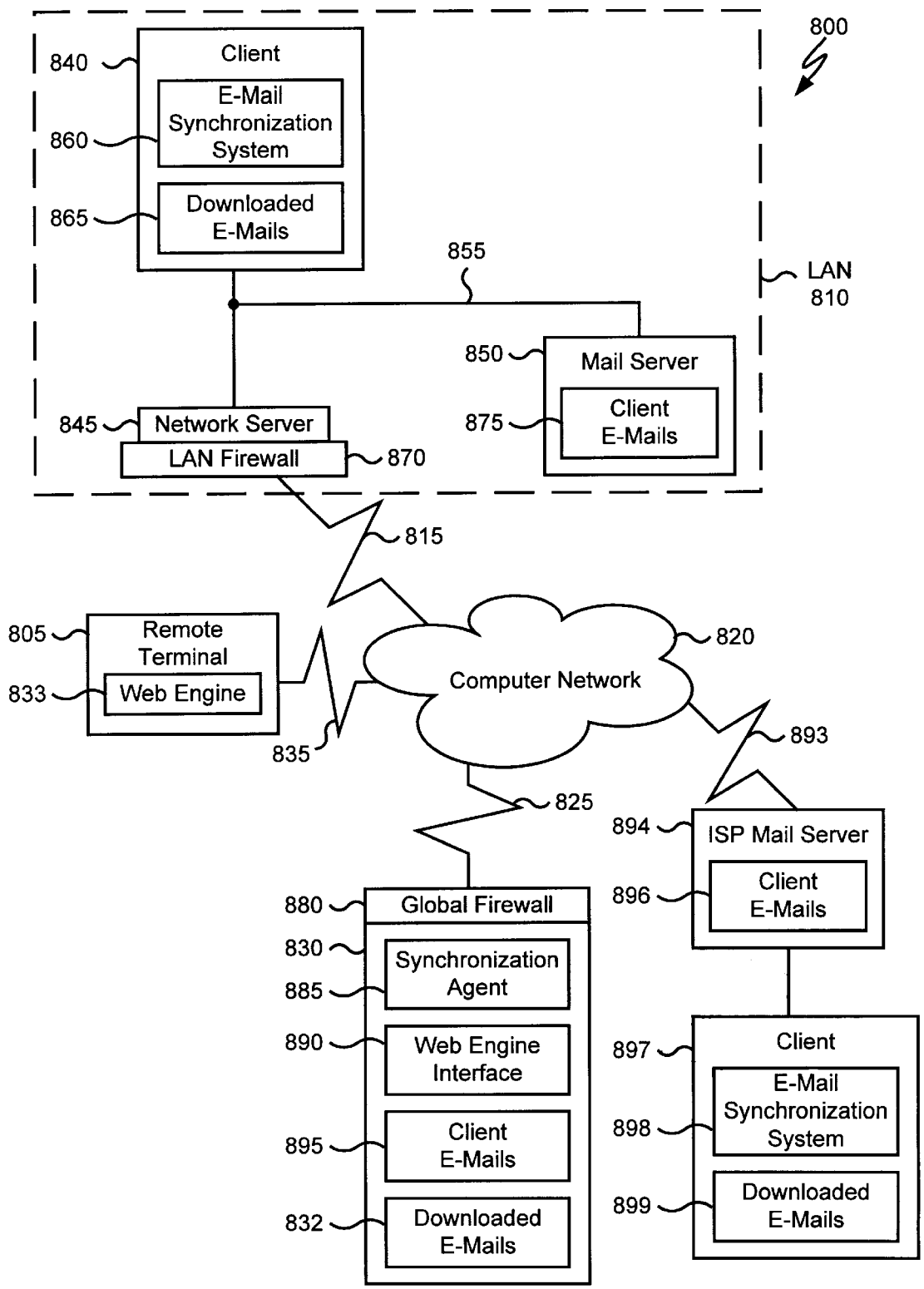
FIG. 8 is a block diagram illustrating a computer network in accordance with the present invention.

FIG. 8 is a block diagram illustrating a computer network 800, comprising a Local Area Network (LAN) 810 coupled via a communications channel 815 to a computer network 820 such as the Internet. The computer network 820 is in turn coupled via a communications channel 825 to a global server 830, via a communications channel 835 to a remote terminal 805, and via a communications channel 893 to an Internet Service Provider (ISP) mail server 894. The ISP mail server 894 is in turn coupled to another client 897. The global server 830 is protected by a global firewall 880, and the LAN 810 is protected by a LAN firewall 870.

The LAN 810 includes a network server 845 coupling the LAN firewall 870 via a system bus 855 to a client 840 and to a mail server 850. The mail server 850 receives and stores in one or more folder structures client electronic mail 875 (e-mails) from the computer network 820 and addressed to the client 840. The client 840 includes an e-mail synchronization system 860 for downloading client e-mails 875 from the mail server 850 and storing them locally in one or more folder structures as "downloaded e-mails 865." To communicate therebetween, the mail server 850 and the e-mail engine 965 must both use the same transmission protocol such as the third version of the Post Office Protocol (POP3), the Vendor-Independent Messaging (VIM) protocol developed by the Lotus Development Corporation, or the Messaging Application Program Interface (MAPI) protocol developed by the Microsoft Corporation. Each e-mail in the LAN 810 is stored in a predetermined format, referred to as Format A, which is determined by the e-mail engine 965 (FIG. 9) on the LAN 810 that downloaded it.

It will be appreciated that, after being downloaded, the client e-mails 875 corresponding to the downloaded e-mails 865 may be deleted from the mail server 850. The e-mail synchronization system 860 further synchronizes the downloaded e-mails 865, the client e-mails 875 or possibly only the e-mails of a specific folder structure (e.g., a user's unanswered mail folder or joke folder) with the global server 835. The e-mail synchronization system 860 is described in greater detail below with reference to FIG. 9.

The ISP mail server 894 and the client 897 operate in a similar manner to the mail server 850 and the client 840. Generally, the ISP mail server 894 receives e-mails from the computer network 820 which are addressed to the client 897, and stores them locally in one or more folder structures as "client e-mails 896." The e-mail synchronization system 898 of the client 897 uses an e-mail engine 965 (FIG. 9) to download client e-mails 896 and store them locally in one or more folder structures as "downloaded e-mails 899." The e-mail engine 965 of the client 897 stores the e-mails in Format B, which may be different than Format A. The e-mail synchronization system 898 then synchronizes the client e-mails 896, the downloaded e-mails 899 or possibly the e-mails of specific folder structures with the global server 830.

Each e-mail, whether stored on the mail server 850, on the client 840, on the mail server 894 (described below) or on the client 897 (described below), may include a source identifier (e.g., a source address), a creation date, a date received by the mail server 850 or 894, and a date when downloaded to the client 840 or 897. The date when downloaded to the client 840 or 897 may be the date when the e-mail synchronization system 860 or 898 downloads the client e-mails 875 or 896 for synchronization with the global server 835.

The global server 835 includes a synchronization agent 885 for cooperating with the e-mail synchronization system 860 or the e-mail synchronization system 898 to synchronize electronic mail therebetween. Based on its configuration, the e-mail synchronization system 860 or 898 translates and sends to the synchronization agent 885 either a copy or the original (i.e., not maintaining a copy) of a downloaded e-mail 865 or 899 or a client e-mail 875 or 896. The global server 835 stores the copies or originals of the downloaded e-mails 865 or 899 in one or more folder structures as "downloaded e-mails 832," and stores the copies or originals of the client e-mails 875 or 896 in one or more folder structures as "client e-mails 895." The global server 835 stores the e-mails in a global format, which may be the same as Format A or Format B or may include the combined elements of both formats. It will be appreciated that the e-mail synchronization system 860 or 898 may send and the global server 835 may store the client e-mails 875 or 896 and the downloaded e-mails 865 or 897 together without distinction. Further, the client e-mails 875 or 896 and the downloaded e-mails 865 of corresponding specific folders together without distinction. Still further, the global server 835 may be configured to store the e-mails of client 840 and client 897 together without distinction. The global server 835 further includes a web engine interface 890 enabling HTTP-based web engine access to the contents therein including access to the client e-mails 895, the downloaded e-mails 832 and the folder structures in which they are stored.

As described in greater detail above with reference to FIG. 4 and below with reference to FIG. 10, the e-mail synchronization system 860 preferably initiates and controls data synchronization. Other components and functions of the global server 835 are also described therein.

The remote terminal 1505 includes a web engine 833 for reading internet files including e-mails. The remote terminal 102 may include a smart telephone, a Personal Data Assistant (PDA) such as the PalmPilot system by the U.S. Robotics, Inc., a laptop computer, etc. Thus, so long as a user of the remote terminal 1505 can be identified and can access the global server 835, the user can access the e-mails 895 and 897. Further, so long as the client e-mails 895 and 832 are synchronized with the e-mails 865, 875, 896 and 899, the user can access all e-mails which are addressed to the client 840 and to the client 897.

Figure 9:
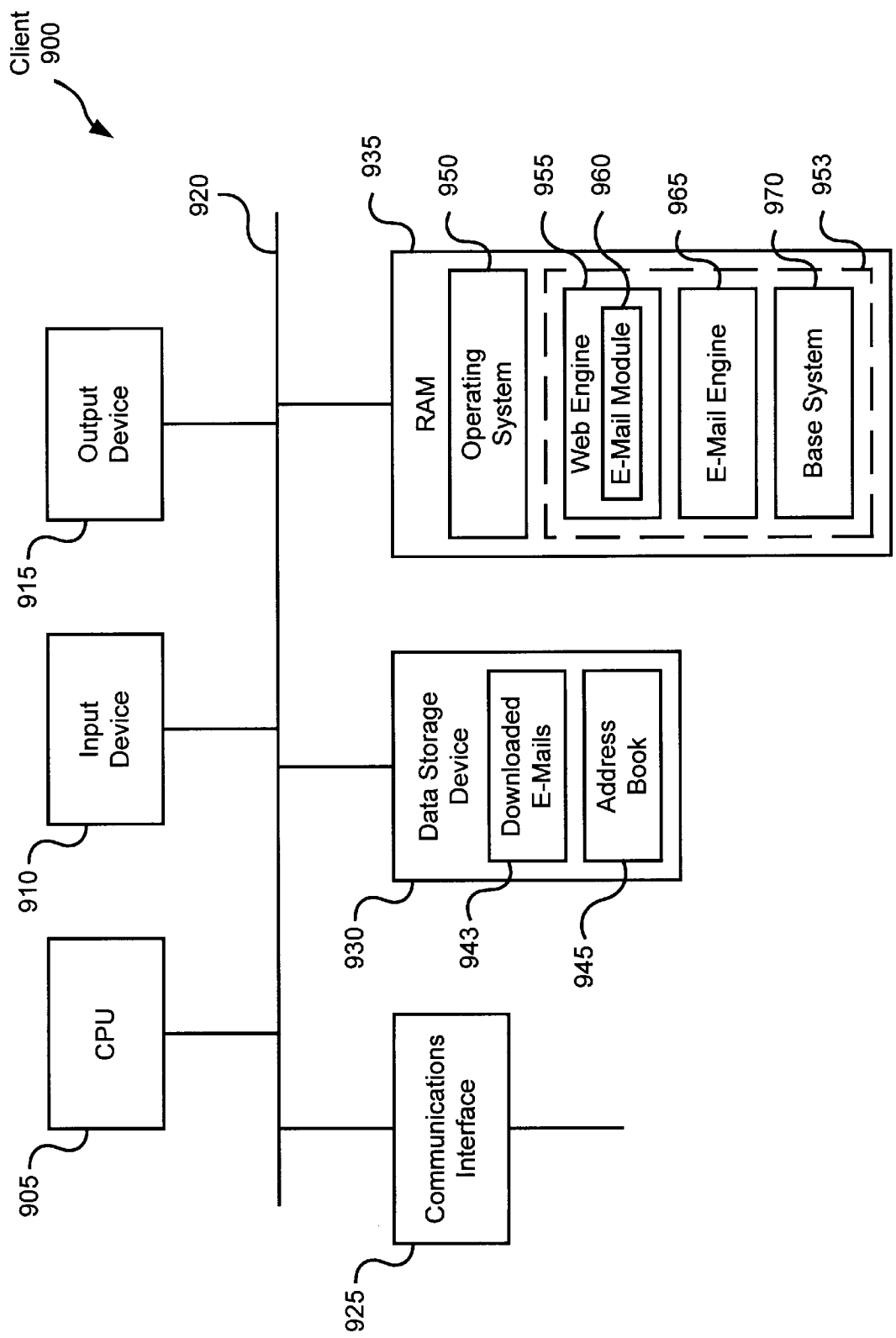
FIG. 9 is a block diagram illustrating details of a FIG. 8 client.

FIG. 9 is a block diagram illustrating details of client 900, which exemplifies client 840 or client 897. Client 900 includes a Central Processing Unit (CPU) 905 such as an Intel Pentium® microprocessor or a Motorola Power PC® microprocessor. An input device 910 such as a keyboard and mouse and an output device 915 such as a Cathode Ray Tube (CRT) display are coupled via a signal bus 920 to CPU 905. A communications interface 925 (such as an Ethernet port), a data storage device 930 (such as a magnetic disk), and Random-Access Memory (RAM) 935 are further coupled via signal bus 920 to the CPU 905. The communications interface 925 is coupled to the signal bus 855 (FIG. 8).

An operating system 950 includes a program for controlling processing by the CPU 905, and is typically stored in the data storage device 930 and loaded into the RAM 935 (as illustrated) for execution. RAM 935 stores an e-mail synchronization system 953 (which exemplifies the e-mail synchronization system 860 or the e-mail synchronization system 898) having means for downloading client e-mails 875 or 896, means for reading downloaded e-mails 943 (which exemplifies downloaded e-mails 865 or 899), means for synchronizing e-mails 865, 875, 896 or 899 (which have been downloaded) with the global server 835 and means for synchronizing the e-mail of specific folder structures. For example, the e-mail synchronization system 953 includes a web engine 955 for communicating with web servers. The web engine 955 includes an e-mail module 960 for reading and writing electronic mail. The e-mail synchronization system 953 further includes an e-mail engine 965 for communicating with the mail server 850 or 894 to download, read and write e-mails. The e-mail engine 965 communicates using a conventional protocol such as POP3, VIM or MAPI. Downloaded e-mails 943 are stored in data storage device 930 (FIG. 9). The e-mail engine 965 also provides access to an address book 945 containing e-mail address entries, which is also stored in the data storage device 930.

The e-mail synchronization system 953 further includes a base system 970 for translating e-mails from Format A or Format B to the global format, and for initiating and controlling e-mail synchronization with the global server 835. Translation may include containing mail-server-formatted e-mail in HTTP packets. The base system 970 is described in greater detail with reference to FIG. 10 and in the cross-referenced patent application.

It will be appreciated that means for retrieving e-mails may be interpreted to include either the operating system 950 when retrieving downloaded e-mails 865 or 899, the e-mail engine 965 when retrieving client e-mails 875 or 896, the e-mail module 960 of the web engine 955 when retrieving e-mails from a site in the computer network 820, or combinations thereof.

Figure 10:
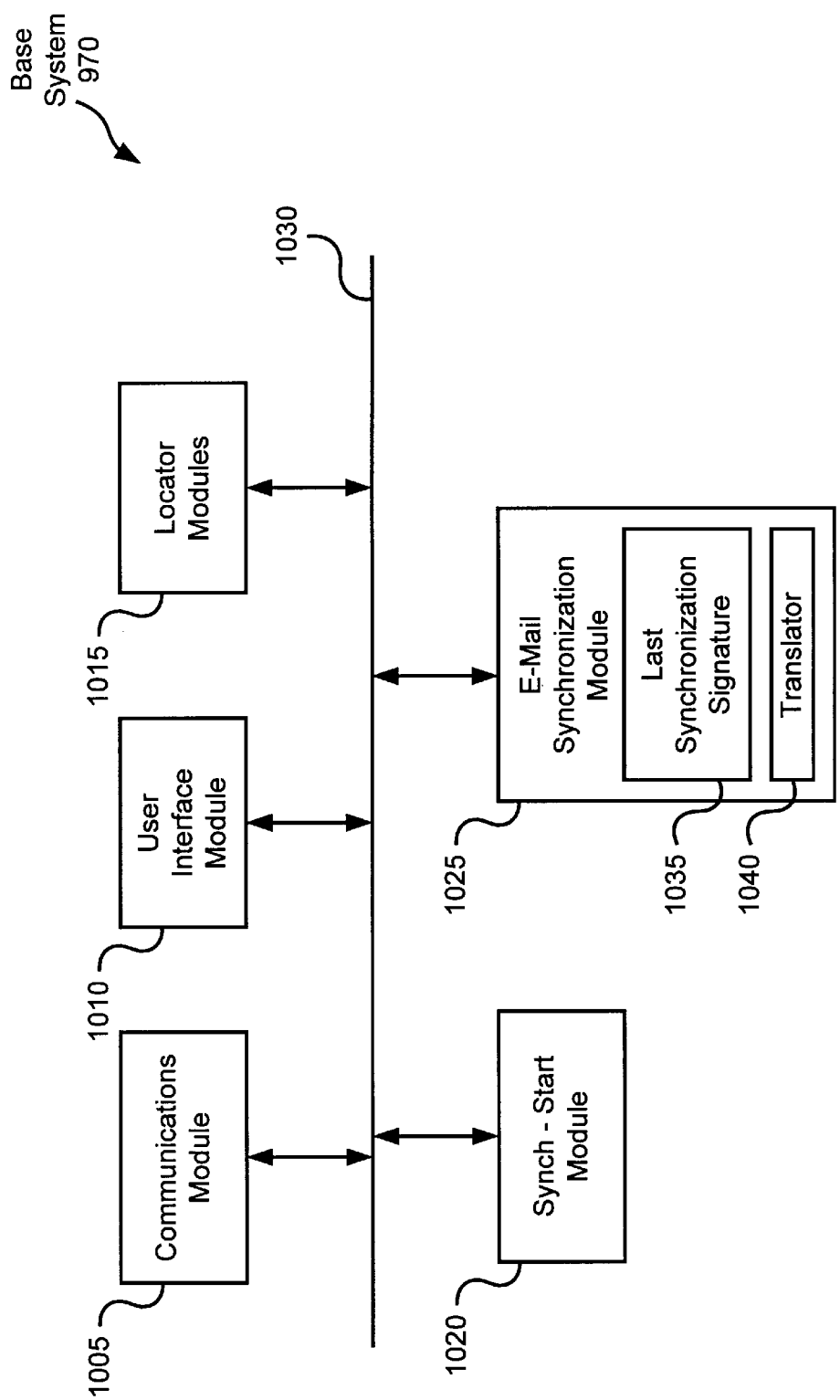
FIG. 10 is a block diagram illustrating details of the FIG. 9 base system.

FIG. 10 is a block diagram illustrating details of the base system 970. Base system 970 includes a communications module 1005, a user interface module 1010, locator modules 1015, a synchronization-start ("synch-start") module 1020 and an e-mail synchronization module 1030. For simplicity, each module is illustrated as communicating with one another via a signal bus 1030.

The communications module 1005 includes routines for compressing data and routines for establishing a communications link via the communications interface 925 (FIG. 9) with the synchronization agent 885 (FIG. 8). The communications module 1005 may further include routines for applying Secure Socket Layer (SSL) technology and user identification and authentication techniques (i.e., digital certificates) to establish a secure communication channel through the global firewall 880. Because synchronization is initiated from within the firewall and uses commonly enabled protocols such as HyperText Transfer Protocol (HTTP), the typical firewall which prevents in-bound communications in general and some outbound protocols does not act as an impediment to e-mail synchronization. Examples of communications modules 1005 may include TCP/IP stacks or the AppleTalk® protocol.

The user interface module 1010 includes routines for communicating with a user, and may include a conventional Graphical User Interface (GUI). The user interface module 1010 cooperates with the other system components as described herein.

The locator modules 1015 include routines for identifying the memory locations of e-mails in the FIG. 8 LAN 810 (e.g., e-mails 875 in the mail server 850 and e-mails 865 in the client 840), the memory locations of e-mails 896 in the ISP mail server 894, the memory locations of e-mails 899 in the client 897, the memory locations of e-mails in the global server 835 (e.g., client e-mails 895 and downloaded e-mails 832) and the memory locations of the folder structures in which the e-mails are stored. E-mail memory location identification may be implemented using intelligent software, i.e., preset memory addresses or the system's registry, or using dialogue boxes to query a user. It will be appreciated that the locator modules 1015 may perform e-mail location identification upon system boot-up or after each communication with the global server 835 to maintain updated memory addresses.

The synchronization-start module 1020 includes routines for determining when to initiate e-mail synchronization. For example, the synchronization-start module 1020 may initiate e-mail synchronization upon user request, at a particular time of day, after a predetermined time period passes, after receiving a predetermined number of e-mails, after a user action such as user log-off or upon like criteria. The synchronization-start module 1020 initiates e-mail synchronization by instructing the e-mail synchronization module 1025 (described below) to begin execution of its routines. It will be appreciated that communication with the synchronization agent 885 preferably initiates from within the LAN 810, because a security system such as the typical firewall 870 prevents inbound communications and allows outbound communications. The synch-start module 1020 may instruct the communications module 1005 to establish the communications link with the synchronization agent 885 of the global server 835.

The e-mail synchronization module 1025 includes routines for instructing the e-mail engine 965 (FIG. 9) to retrieve the client e-mails 875 or 896 from the mail server 850 or 894 or from specific folders on the mail server 850 or 894. The e-mail synchronization module 1025 also includes routines for storing the retrieved e-mails in one or more folder structures as downloaded e-mails 865 or 899. The e-mail engine 965 may include means for identifying a transmission protocol also known by the mail server 850 or 894. For example, the e-mail engine 965 may request configuration information from the mail server 850 or 894 indicating the protocol, e.g., POP3, being used thereby. Accordingly, the e-mail engine 965 implements the identified protocol when downloading the e-mails.

The e-mail synchronization module 1025 further includes routines for comparing the receipt date of each downloaded e-mail 865 or 899 against a last synchronization signature 1035 (such as a last synchronization date and time) to determine which e-mails have not been sent to the global server 835. It will be appreciated that, in an embodiment which deletes client e-mails 875 or 896 after being downloaded from the mail server 850 or 894, the e-mail synchronization module 1025 need not perform a comparison test on the client e-mails 875 or 896 downloaded during synchronization. These client e-mails 875 or 896 in this embodiment have inherently not been sent.

The e-mail synchronization module 1025 still further includes routines for performing an appropriate synchronizing responsive action. Appropriate synchronizing responsive actions may include instructing the communications module 1005 to establish a communications link with the synchronization agent 885 of the global server 835, sending copies of each e-mail to the global server 835, redirecting (i.e., sending without maintaining a copy) only the client e-mails 875 or 896 to the global server 835, or redirecting the downloaded e-mails 865 or 899 and the client e-mails 875 or 896 to the global server 835. To send a copy or an original of an e-mail, the e-mail synchronization module 1025 includes a translator 1040 for translating the e-mail from Format A or Format B to the global format. The e-mail synchronization module 1025 then instructs the e-mail module 960 of the web engine 955 to send the translated e-mails to the global server 835.

E-mail synchronization may include synchronization of other information corresponding to electronic mail. For example, the e-mail synchronization module 1025 may include routines for examining and synchronizing the address book 945 with an address book 1130 (FIG. 11) on the global server 835. Examination and synchronization of address book entries are performed as described below with reference to FIGS. 1–7. Generally, the e-mail synchronization module 1025 may examine version information indicating the date and time of last modification of the address book 945 on the client 900 and version information indicating the date and time of last synchronization of the address book 1130 (FIG. 11) on the global server 835. Based on the examination, the e-mail synchronization module 1025 performs an appropriate responsive synchronizing action such as sending the updated e-mail address entries to the other store. The e-mail synchronization module 1025 may include a general synchronization module 425 (FIG. 4) and a content-based synchronization module 430 (FIG. 4).

Figure 11:
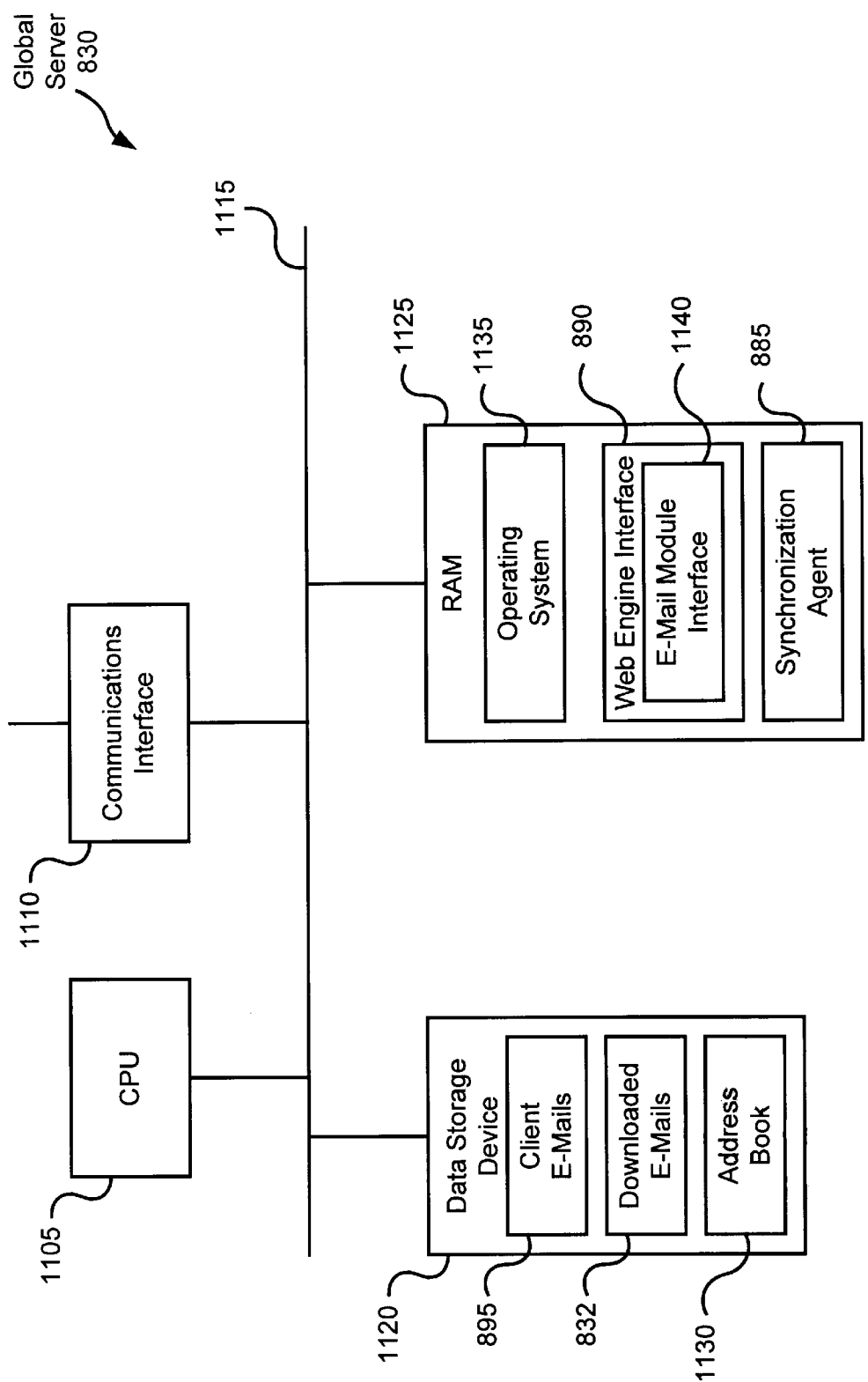
FIG. 11 is a block diagram illustrating details of a FIG. 8 global server.

FIG. 11 is a block diagram illustrating details of the global server 835, which includes a CPU 1105, a communications interface 1110, a data storage device 1120 and RAM 1125, each coupled to a signal bus 1115. The communications interface 1110 is coupled via the global firewall 880 (FIG. 8) to the communications channel 825.

An operating system 1135 includes a program for controlling processing by the CPU 1105, and is typically stored in the data storage device 1120 and loaded into the RAM 1125 (as illustrated) for execution. A web engine interface 890 is a program for communicating with web engine 833 or web engine 955 and to provide access to predetermined contents which may include client e-mails 895, downloaded e-mails 832 and address book 1130. The web engine interface 890 includes an e-mail module interface 1140 for communicating with e-mail module 960 or e-mail module 1355 (FIG. 13) and to provide e-mail reading and writing functions.

Figure 12:
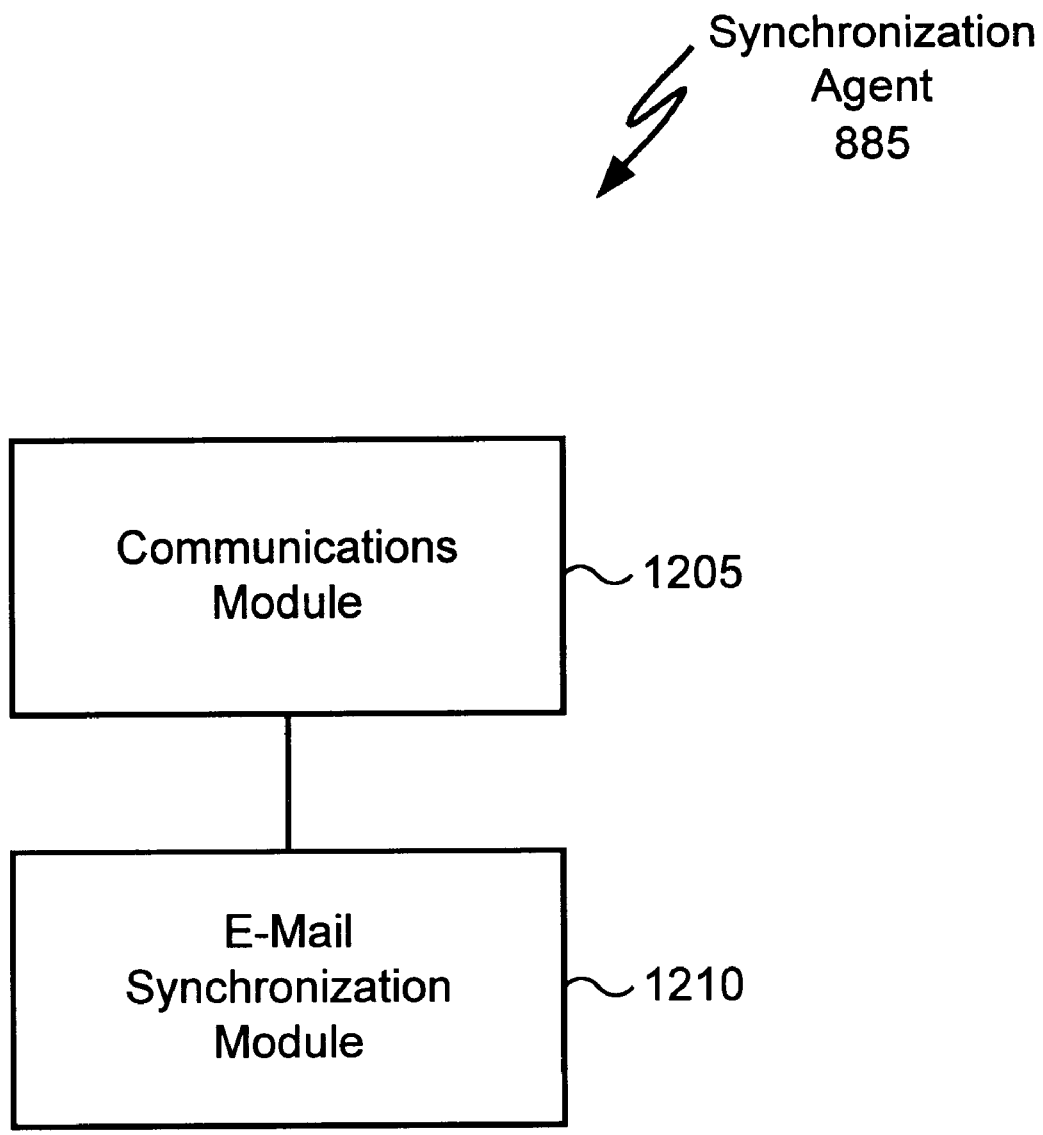
FIG. 12 is a block diagram illustrating details of the FIG. 8 synchronization agent.

The synchronization agent 885 as best shown in FIG. 12 is also stored in the data storage device 1120 and loaded into the RAM 1125 for execution. The synchronization agent 885 communicates with the e-mail synchronization module 1025 to synchronize e-mails, the e-mail of specific folder structures and possibly to synchronize the address book 945. The synchronization agent 885 is described in greater detail below with reference to FIG. 12 and in the cross-referenced patent application.

FIG. 12 is a block diagram illustrating details of the synchronization agent 885, which includes a communications module 1205 (similar to the communications module 1005 described above with reference to FIG. 10) and an e-mail synchronization module 1210 (similar to the e-mail synchronization module 1025 also described above with reference to FIG. 10).

The communications module 1205 includes routines for compressing data, and routines for communicating via the computer network 820 (FIG. 8) with the communications module 1005 (FIG. 10). The communications module 1205 may further include routines for establishing a secure communications channel through the global firewall 880 and through the LAN firewall 870 with the communications module 1005.

Similar to the e-mail synchronization module 1025 (FIG. 10), the e-mail synchronization module 1210 includes routines for examining information to determine whether any have been added or modified and not synchronized with the client 840 (FIG. 8). Accordingly, the e-mail synchronization module 1210 may determine whether any addresses in the address book 1130 (FIG. 11) are to be copied and sent to a client 900. Further, if the system 1500 synchronizes e-mails at each of the client sites, then the e-mail synchronization module 1210 also determines whether any of the e-mails 895 or 832 have been added or modified and not synchronized with a client 900.

It will be appreciated that the e-mail synchronization module 1210 may maintain its own last synchronization signature 1035 copy (not shown) or may request the last synchronization signature 1035 from the base system 970. The e-mail synchronization module 1210 further includes routines for sending the information determined to be modified or just the changes to the e-mail synchronization module 1025.

Figure 13:
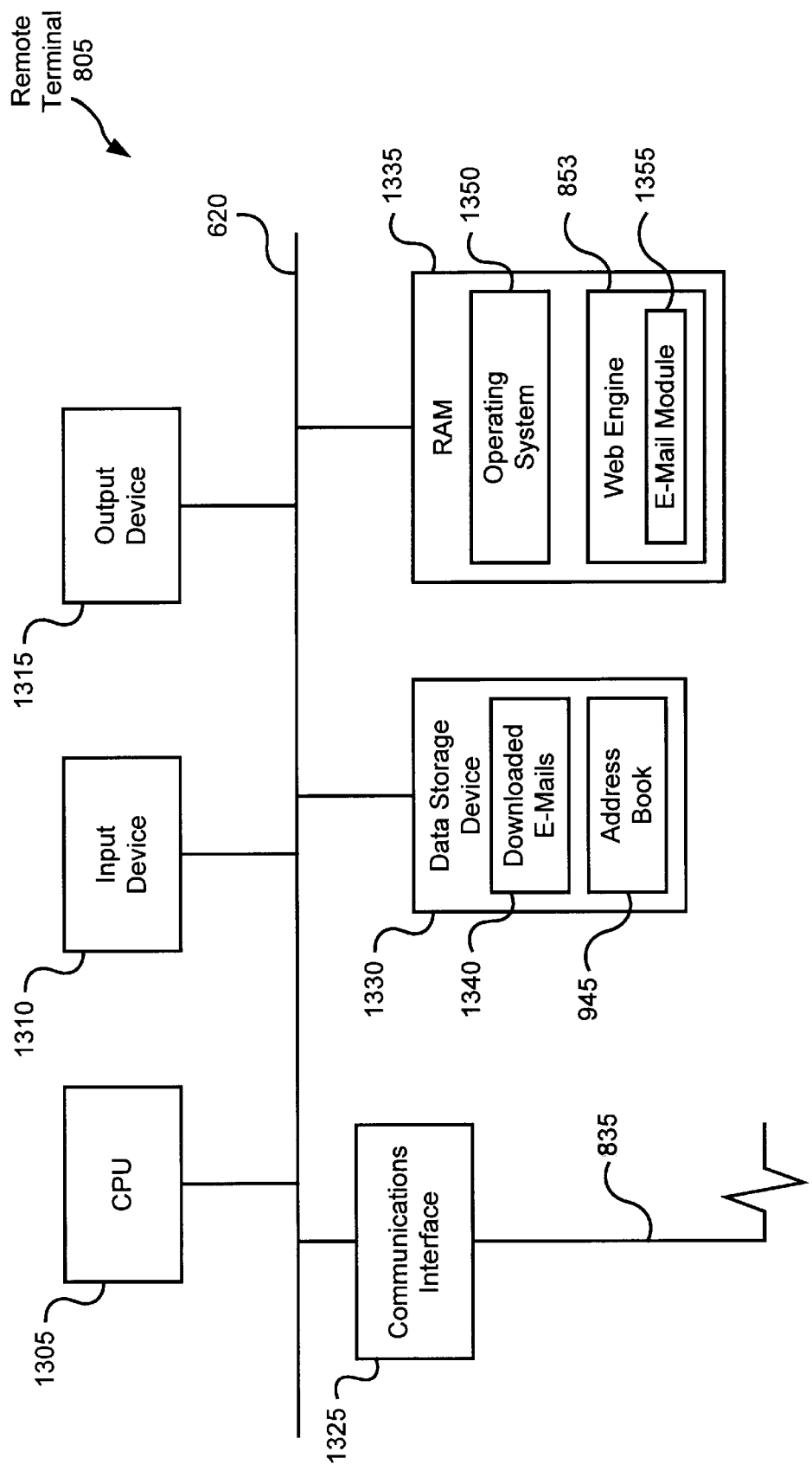
FIG. 13 is a block diagram illustrating details of the FIG. 8 remote terminal.

FIG. 13 is a block diagram illustrating details of the remote terminal 1505. The remote terminal 1505 includes a Central Processing Unit (CPU) 1305 such as an Intel Pentium® microprocessor or a Motorola Power PC® microprocessor. An input device 1310 such as a keyboard and mouse and an output device 1315 such as a Cathode Ray Tube (CRT) display are coupled via a signal bus 1320 to CPU 1305. A communications interface 1325 (such as an Ethernet port), a data storage device 1330 (such as a magnetic disk), and Random-Access Memory (RAM) 1335 are further coupled via signal bus 1320 to the CPU 1305. The communications interface 1325 is coupled to the signal bus 835 (FIG. 8).

An operating system 1350 includes a program for controlling processing by the CPU 1305, and is typically stored in the data storage device 1330 and loaded into the RAM 1335 (as illustrated) for execution. The web engine 833 is also typically stored in the data storage device 1330 and loaded into the RAM 1335 (as illustrated) for execution. The web engine 833 includes an e-mail module 1355 for reading and writing electronic mail. After the remote terminal 1505 connects with the global server 835, the e-mail module 1355 communicates with the e-mail module interface 1140 to select and to download client e-mails 895 or downloaded e-mails 832. The e-mail module 1355 stores the e-mails downloaded from the global server 835 to the data storage device 1330 as "downloaded e-mails 1340." Alternatively, the e-mail module 1355 may store the e-mails 1340 only in RAM 1335 so that at the end of the session copies of the e-mails 1340 do not remain at the remote terminal 1505. The e-mail module 1355 enables the user to read, reply, forward, redirect, etc. the e-mails 1340. Similarly, the web engine 833 may enable access to the address book 945 so that the user can access his or her e-mail address entries otherwise stored only in the LAN 810.

Figure 14:
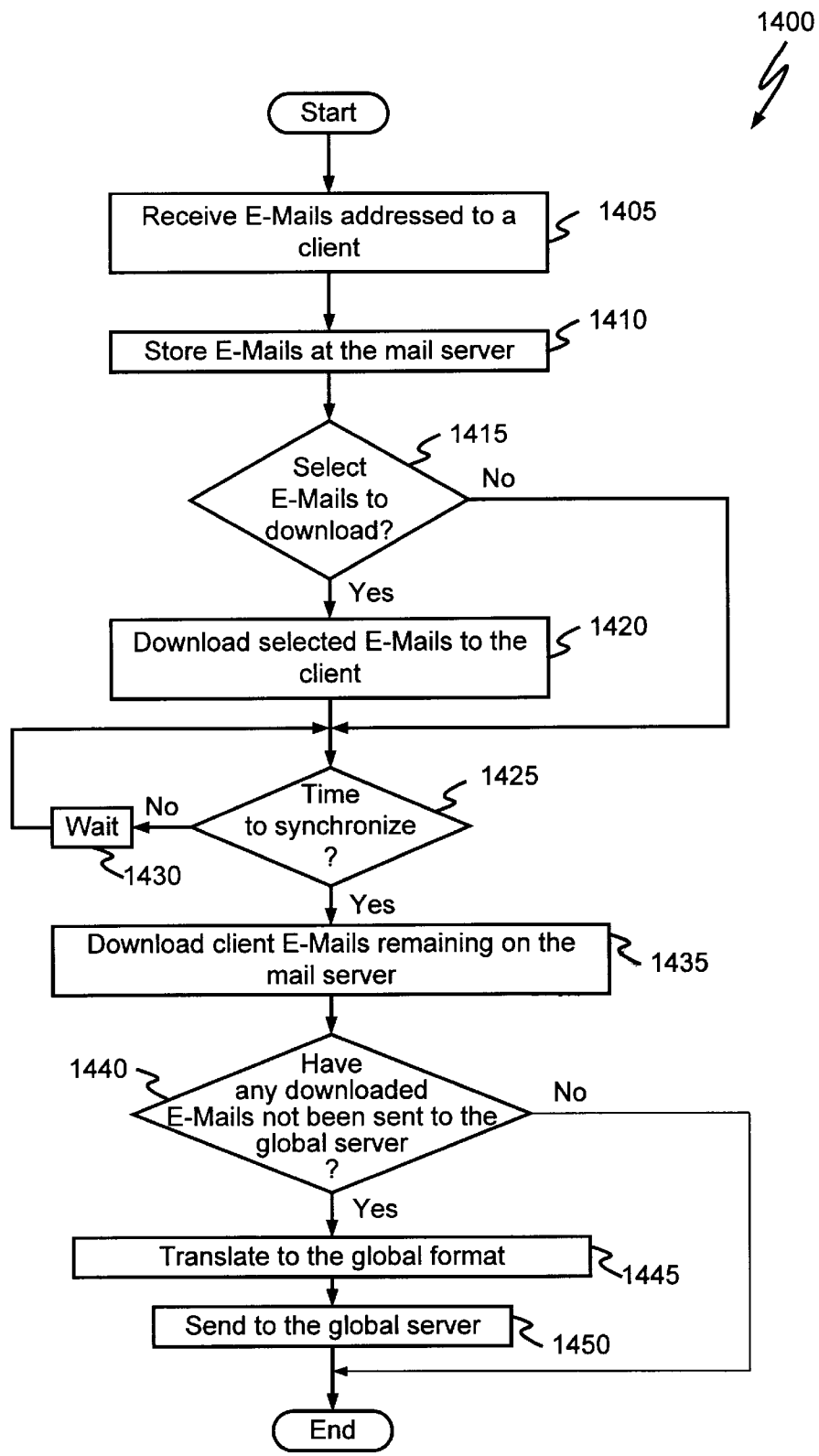
FIG. 14 is a flowchart illustrating a method for synchronizing electronic mail in a computer network.

FIG. 14 is a flowchart illustrating a method 1400 for synchronizing e-mails in a computer network 1500. Method 1400 begins with the mail server 850 or 894 in step 1405 receiving e-mails addressed to a client 840 or 897. The mail server 850 or 894 in step 1410 stores the received e-mails in one or more folder structures as client e-mails 875 or in one or more folder structures as client e-mails 896 (FIG. 8). The e-mail engine 965 in step 1415 enables a user to select client e-mails 875 or 894 to download from the mail server 850 or 896. If e-mails are selected, then the e-mail engine 965 in step 1420 downloads the selected client e-mails 875 or 894 and stores them in one or more folder structures as downloaded e-mails 865 or in one or more folder structures as downloaded e-mails 899 (FIG. 8). If in step 1415 e-mails are not selected, then method 1400 jumps to step 1425.

In step 1425, the synchronization-start module 1020 determines whether predetermined start criteria have been met indicating that it is time for e-mail synchronization. As stated above with reference to FIG. 4, the predetermined start criteria may be satisfied after a particular time period has passed, after receiving a particular number of e-mails, at a particular time of day, after a predetermined event, etc. If it is not time to synchronize, then the synchronization-start module 1020 in step 1430 waits. Otherwise, if it is time to synchronize, the e-mail synchronization module 1025 in step 1435 instructs the e-mail engine 965 to download client e-mails 875 or 896 or client e-mails 875 or 896 of specific folder structures.

The e-mail synchronization module 1025 in step 1440 determines whether any of the downloaded e-mails 865 or 899 (which include the client e-mails 875 or 896 recently downloaded) have not been sent to the global server 835. This comparison may be performed by examining the date and time the e-mail was received against a last synchronization signature 1035 which indicates the date and time of last synchronization. For example, if an e-mail was received after the date and time of last synchronization, the e-mail has not been sent. It will be appreciated that, in an embodiment which deletes client e-mails 875 and 896 from the mail server 850 or 894 after downloading them to the client 840 or 897, the e-mail engine 965 can automatically conclude that these e-mails have not been sent to the global server 835.

If all e-mails (intended for synchronization) have been sent to the global server 835, then method 1400 ends. Otherwise, if at least one e-mail has not been sent, then the e-mail synchronization module 1025 in step 1445 uses the translator 1040 to translate unsent e-mails 865 or 899 from Format A or Format B to the global format. The e-mail synchronization module 1025 in step 1450 instructs the web engine 955 to send the translated e-mail to the global server 835 for the web engine interface 890 to store. Method 1400 then ends.

Figure 15:
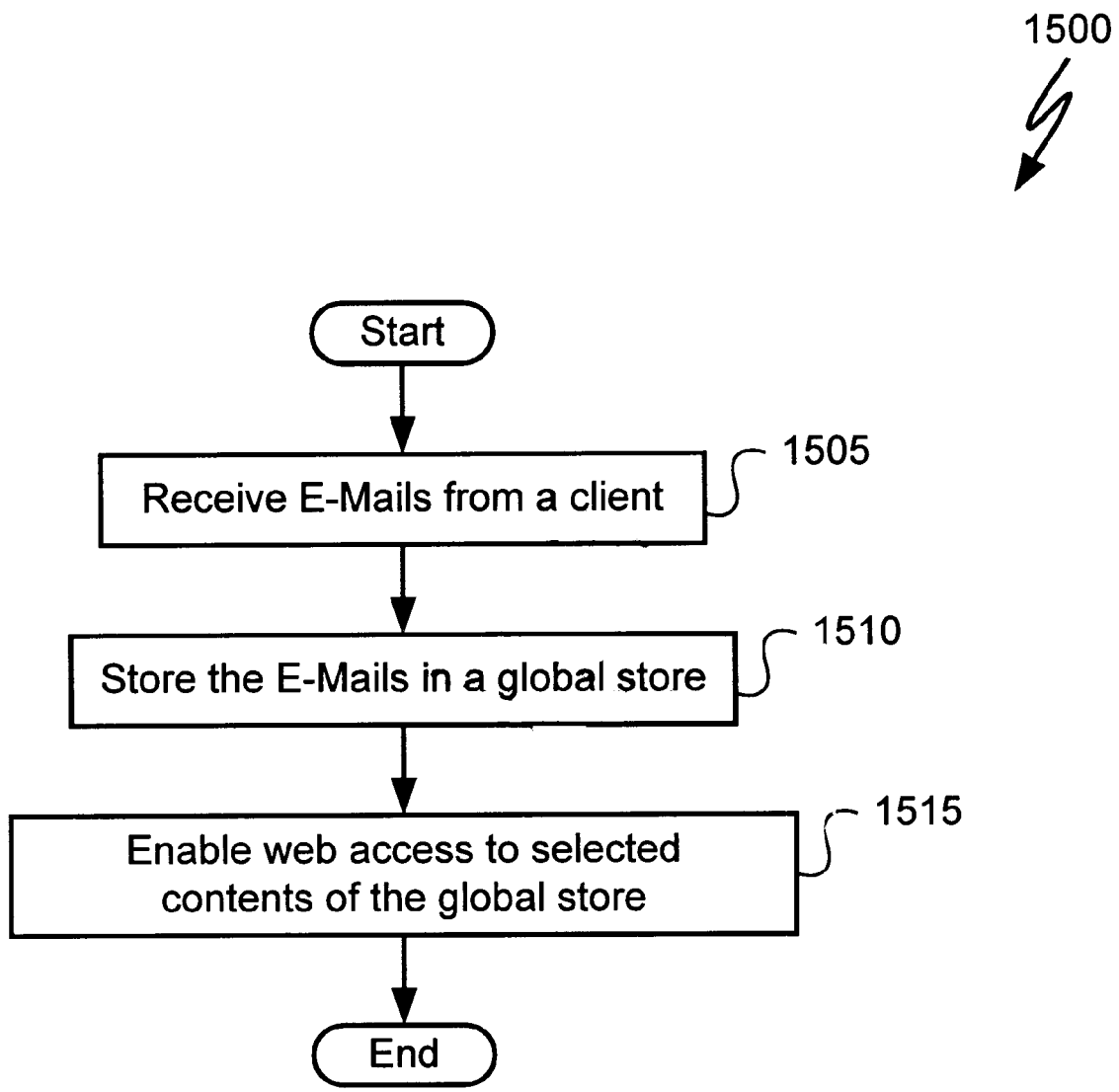
FIG. 15 is a flowchart illustrating a method for accessing electronic mail from the global server of FIG. 8.

FIG. 15 is a flowchart illustrating a method 1500 for accessing e-mails from the global server 835. Method 1500 begins with the e-mail synchronization module 1210 in step 1505 receiving e-mails from the client 840 or 897. The e-mail synchronization module 1210 in step 1510 stores the e-mails in the data storage device 1120 in one or more folder structures as client e-mails 895 and downloaded e-mails 832. The e-mail engine interface 890 in step 1515 uses HTML to enable e-mail module access to selected contents of the global server 835. Access to the selected contents is described in greater detail below with reference to the FIGS. 1–7.

The foregoing description of the preferred embodiments of the invention is by way of example only, and other variations of the above-described embodiments and methods are provided by the present invention. For example, although the global server 106 is illustrated as a single device, the global server 106 may include several computers networked together. Components of this invention may be implemented using a programmed general-purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The system is limited only by the following claims.

What is claimed is:

1. A client system comprising:
   obtaining means for obtaining e-mail from a mail server;
   determining means for using a predetermined criterion to determine whether to send the e-mail to a central mail store;
   establishing means, coupled to the determining means, for establishing a communications channel with the central mail store; and
   sending means, coupled to the establishing means, for sending e-mail to the central mail store.

2. The system of claim 1 wherein the mail server implements a first protocol.

3. The system of claim 2 wherein the obtaining means includes an e-mail engine for communicating with the mail server.

4. The system of claim 3 wherein the e-mail engine implements the first protocol used by the mail server.

5. The system of claim 4 wherein the e-mail engine identifies the first protocol used by the mail server.

6. The system of claim 1 wherein the predetermined criterion includes a determination of whether e-mail has already been sent to the central mail store.

7. The system of claim 6 wherein the determination is resolved by examining a receipt date corresponding to the e-mail and a last synchronization signature indicating the last date of synchronization with the central mail store.

8. The system of claim 1 wherein the establishing means includes a communications module.

9. The system of claim 8 wherein the central mail store is protected by a firewall and the communications module includes security means for communicating through the firewall.

10. The system of claim 1 further comprising means for selecting a folder structure for synchronization of all e-mails therein.

11. The system of claim 1 wherein the sending means includes a web engine.

12. The system of claim 1 further comprising a synchronization-start module for using a start criterion to determine when to initiate synchronization with the central mail store.

13. A client-based method comprising:
   obtaining an e-mail from a mail server;
   using a predetermined criterion to determine whether to send the e-mail to a central mail store;
   establishing a communications channel with the central mail store, if the predetermined criterion indicates sending the e-mail; and
   sending the e-mail to the mail store, if the predetermined criterion indicates sending the e-mail.

14. The method of claim 13 further comprising means for selecting a folder structure for synchronization of all e-mails therein.

15. The method of claim 14 wherein the step of retrieving includes using the first protocol.

16. The method of claim 15 wherein the step of retrieving includes the step of identifying the first protocol.

17. The method of claim 14,
   wherein the central mail store is protected by a firewall; and
   further comprising the step of communicating through the firewall.

18. The method of claim 13 wherein the step of using a predetermined criterion includes determining whether e-mail has already been sent to the central mail store.

19. The method of claim 18 wherein the step of determining includes examining a receipt date corresponding to the e-mail and a last synchronization signature which indicates the last date of synchronization with the central mail store.

20. The method of claim 13 wherein the mail server implements a first protocol.

21. The method of claim 13 wherein the central mail store is remotely located and the step of sending includes communicating e-mail through a computer network.

22. The method of claim 13 further comprising a synchronization-start module for using a start criterion to determine when to initiate synchronization with the central mail store.

23. A client system comprising:
   an e-mail engine for obtaining e-mail from a mail server;
   an e-mail synchronization module for using a predetermined criterion to determine whether to send e-mail to a central mail store;
   a communications module coupled to the e-mail synchronization module for establishing a communications channel with the central mail store; and
   a web engine, coupled to the communications module, for sending e-mail to the central mail store.

24. The system of claim 23 wherein the mail server implements a first protocol.

25. The system of claim 24 wherein the e-mail engine implements the first protocol used by the mail server to communicate with the mail server.

26. The system of claim 25 wherein the e-mail engine identifies the first protocol.

27. The system of claim 23 wherein the predetermined criterion includes a determination of whether e-mail has already been sent to the central mail store.

28. The system of claim 27 wherein the determination is resolved by examining receipt date corresponding to the e-mail and a last synchronization signature indicating the last date of synchronization with the central mail store.

29. The system of claim 23 further comprising means for selecting a folder structure for synchronization of all e-mails therein.

30. The system of claim 23 wherein the central mail store is protected by a firewall and the communications module includes security means for communicating through the firewall.

31. The system of claim 23 further comprising a synchronization-start module for using a start criterion to determine when to initiate synchronization with the central mail store.

32. A client system for automatically downloading e-mails for a particular client from a mail server which implements a particular protocol, comprising:
   means for automatically initiating a communications channel with a mail server;
   means for identifying the particular protocol used by the mail server; and
   means for using the particular protocol to download e-mails addressed to a particular client from the mail server.

33. The system of claim 32 wherein the means for identifying includes means for receiving configuration information from the mail server.

34. A computer-readable storage medium storing program code for causing a client computer to perform the steps of:
   obtaining e-mail from a mail server;
   using a predetermined criterion to determine whether to send e-mail to a central mail store;
   establishing a communications channel with the central mail store; and
   sending e-mail to the central mail store.

* * * * *

US005961590C1

(12) EX PARTE REEXAMINATION CERTIFICATE (7529th)
United States Patent
Mendez et al.

(10) Number: US 5,961,590 C1
(45) Certificate Issued: May 25, 2010

(54) SYSTEM AND METHOD FOR SYNCHRONIZING ELECTRONIC MAIL BETWEEN A CLIENT SITE AND A CENTRAL SITE

(75) Inventors: Daniel J. Mendez, Mountain View, CA (US); Mark D. Riggins, San Jose, CA (US); Prasad Wagle, Santa Clara, CA (US); Christine C. Ying, Foster City, CA (US)

(73) Assignee: Visto Corporation, Redwood Shores, CA (US)

Reexamination Request:
No. 90/010,495, Apr. 14, 2009

Reexamination Certificate for:
Patent No.: 5,961,590
Issued: Oct. 5, 1999
Appl. No.: 08/897,888
Filed: Jul. 22, 1997

Related U.S. Application Data

(63) Continuation-in-part of application No. 08/865,075, filed on May 29, 1997, now Pat. No. 6,023,708, and a continuation-in-part of application No. 08/835,997, filed on Apr. 11, 1997, now Pat. No. 6,085,192.

(51) Int. Cl.
*G06Q 10/00* (2006.01)
*H04L 29/06* (2006.01)
*H04L 12/58* (2006.01)

(52) U.S. Cl. ..................................... 709/206
(58) Field of Classification Search ........................ None
See application file for complete search history.

(56) References Cited

U.S. PATENT DOCUMENTS 5,857,201 A 1/1999 Wright, Jr. et al.
5,968,131 A 10/1999 Mendez et al.
6,006,274 A 12/1999 Hawkins et al.
6,023,708 A 2/2000 Mendez et al.
6,085,192 A 7/2000 Mendez et al.
6,708,221 B1 3/2004 Mendez et al.
6,766,454 B1 7/2004 Riggins
7,039,679 B2 5/2006 Mendez et al.
7,225,231 B2 5/2007 Mendez et al.
2004/0152089 A1 8/2004 Kraemer et al.
2006/0195595 A1 8/2006 Mendez et al.
2007/0174433 A1 7/2007 Mendez et al.

OTHER PUBLICATIONS

Hotmail, "Frequently Asked Questions", http://web.archive.org/web/19970408045941/www.hotmail.com/faq.html, 11 pages.

(Continued)

*Primary Examiner*—Ovidio Escalante

(57) ABSTRACT

A system includes an e-mail engine which uses a proper protocol to retrieve an e-mail from a first mail store and to store the e-mail in one or more folder structures. Upon request, the first mail store may send configuration data indicating the proper protocol to the e-mail engine, which can then properly configure itself. An e-mail synchronization module uses a predetermined criterion to determine whether the e-mail was previously sent and whether to synchronize the e-mail with a second mail store. The e-mail synchronization module may also synchronize the e-mail of specific folder structures. The second mail store may be located on a global server, which upon proper identification and authentication provides roaming users with access to its contents. A communications module establishes a communications channel through any firewalls with the second mail store. A web engine sends the e-mail via the communications channel to the second mail store.

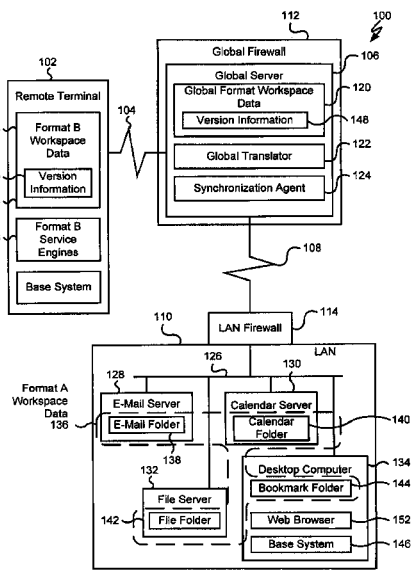

OTHER PUBLICATIONS

"POP3Fido Overview", http://web.archive.org/web/19970716030724/www.keysolutions.com/keyhome.nsf/e7ffc4c4c3c31e03852563b0007106bf/391fe0acb2fec9e4852563b0007344d9?OpenDocument, 2 pages.

Douglas Terry, et al., *Managing Update Conflicts in Bayou, A Weakly Connected Replicated Storage System*, ACM Symposium on Operating Systems Principles, Dec. 1995.

M. Lambert, *PCMail: A Distributed Mail System for Personal Computers*, Network Working Group, RFC 1056, Jun. 1988.

John P. Lamb and Peter W. Lew, *Lotus Notes Network Design*, 1996, McGraw–Hill.

Kevin Brown et al., *Mastering Lotus Notes*, Sybex Incorporated, 1995.

*Lotus Notes Release 4.5 Administrator's Guide*, 1996 Lotus Development Corporation, Cambridge, MA.

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claim 12, dependent on an amended claim, is determined to be patentable.

New claims 35-50 are added and determined to be patentable.

Claims 2-11 and 13-34 were not reexamined.

1. A client system *to synchronize e-mails between an ISP mail server and a smartphone, the client system* comprising:
   obtaining means for obtaining *an* e-mail *to be synchronized* from [a] *the ISP* mail server;
   determining means for using a predetermined criterion to determine whether to send the e-mail *to be synchronized* to a central mail store;
   establishing means, coupled to the determining means, for establishing a communications channel with the central mail store, *the central mail store communicating with the smartphone via an Internet connection*; [and]
   sending means, coupled to the establishing means, for sending *the* e-mail *to be synchronized* from the client system via the communications channel to the central mail store, *to synchronize the e-mail with respect to the smartphone; and*
   *receiving means for receiving an e-mail modification at the client system from said central mail store, to further synchronize the e-mail with respect to the smartphone.*

35. *The client system of claim 1, wherein the client system configures the retrieval of the e-mail to be synchronized from the ISP mail server to the smartphone according to a protocol used by the ISP mail server.*

36. *The client system of claim 1, further comprising:*
   *format translation means for translating a format of the e-mail obtained from the ISP mail server before sending the e-mail to the central store.*

37. *The client system of claim 1, wherein the client system is protected by a firewall and the client system includes security means for communicating through the firewall.*

38. *The client system of claim 37, wherein the firewall prevents general in-bound communications.*

39. *A client-based method to synchronize e-mails between the ISP mail server and a smartphone, comprising:*
   *obtaining an e-mail to be synchronized from the ISP mail server;*
   *using a predetermined criterion to determine whether to send the e-mail to be synchronized to a central mail store;*
   *establishing a communication channel with the central mail store, when the predetermined criterion indicates sending the e-mail to be synchronized, the central mail store communicating with the smartphone via an Internet connection;*
   *sending the e-mail to be synchronized to the central mail store via the communications channel, when the predetermined criterion indicates sending the e-mail, to synchronize the e-mail with respect to the smartphone; and*
   *receiving an e-mail modification to be synchronized at a client system from said central mail store, to further synchronize the e-mail with respect to the smartphone.*

40. *The method of claim 39, further comprising:*
   *selecting a folder structure for synchronization of all e-mails therein, when the ISP mail server stores the e-mails in a folder structure.*

41. *The method of claim 40, further comprising selecting a specific folder within the folder structure.*

42. *The method of claim 39, further comprising:*
   *establishing secure communications through a firewall, when the central mail store is protected by a firewall.*

43. *The method of claim 39 wherein the step of using a predetermined criterion includes determining whether the e-mail has been previously sent to the central mail store.*

44. *The method of claim 39 wherein the step of determining includes examining a receipt date corresponding to the e-mail and a last synchronization signature indicating a last date of synchronization with the central mail store.*

45. *The method of claim 39 wherein the ISP mail server implements a first protocol.*

46. *The method of claim 39, wherein the central mail store is remotely located and the step of sending includes communicating the e-mail to be synchronized through a computer network.*

47. *The method of claim 39 further comprising:*
   *using a synchronization-start criterion to determine when to initiate synchronization with the central mail store.*

48. *The method of claim 47, wherein the synchronization start criterion includes determining whether a predetermined number of e-mails have been received.*

49. *The method of claim 39, further comprising:*
   *translating a format of the e-mail to be synchronized before sending the e-mail to be synchronized to the central mail store.*

50. *A computer-readable storage medium storing computer-readable instructions thereon, the computer readable instructions when executed by a client computer cause the client computer to perform a method comprising:*
   *obtaining an e-mail to be synchronized from the ISP mail server;*
   *using a predetermined criterion to determine whether to send the e-mail to be synchronized to a central mail store;*
   *establishing a communication channel with the central mail store, when the predetermined criterion indicates sending the e-mail to be synchronized, the central mail store communicating with the smartphone via an Internet connection;*
   *sending the e-mail to be synchronized to the central mail store via the communications channel, when the predetermined criterion indicates sending the e-mail, to synchronize the e-mail with respect to the smartphone; and*
   *receiving an e-mail modification to be synchronized at the client computer from said central mail store, to further synchronize the e-mail with respect to the smartphone.*

\* \* \* \* \*